United States Patent [19]

Yagasaki et al.

[11] Patent Number: 5,768,469

[45] Date of Patent: Jun. 16, 1998

[54] APPARATUS FOR CODING AND DECODING A DIGITAL VIDEO SIGNAL HAVING DUPLICATE PICTURES AND FRAMES WITH FIELDS ORIGINATING FROM DIFFERENT FILM SOURCE FRAMES

[75] Inventors: Yoichi Yagasaki, Kanagawa; Teruhiko Suzuki, Chiba, both of Japan

[73] Assignee: Sony Corporation, Tokyo, Japan

[21] Appl. No.: 740,465

[22] Filed: Oct. 29, 1996

Related U.S. Application Data

[63] Continuation of Ser. No. 124,299, Sep. 20, 1993.

[30] Foreign Application Priority Data

| Sep. 18, 1992 | [JP] | Japan | 4-249792 |
| Oct. 29, 1992 | [JP] | Japan | 4-291696 |
| Jul. 6, 1993 | [JP] | Japan | 5-166745 |

[51] Int. Cl.$^6$ .............................. H04N 5/917; H04N 7/26
[52] U.S. Cl. .............................. 386/109; 386/111
[58] Field of Search .............................. 348/415, 416, 348/97, 413, 401, 423; 386/46, 109, 27, 110, 131, 111, 112; H04N 5/917, 7/26

[56] References Cited

U.S. PATENT DOCUMENTS

| 4,788,589 | 11/1988 | Kondo | 358/133 |
| 5,016,101 | 5/1991 | Richards et al. | 358/140 |
| 5,140,437 | 8/1992 | Yonemitsu et al. | 358/342 |
| 5,191,427 | 3/1993 | Richards | 358/214 |
| 5,221,966 | 6/1993 | Clayton et al. | 358/140 |
| 5,241,382 | 8/1993 | Paik et al. | 358/133 |
| 5,255,091 | 10/1993 | Lyon et al. | 358/140 |
| 5,267,035 | 11/1993 | Weckenbrock et al. | 358/105 |
| 5,272,529 | 12/1993 | Frederiksen | 358/133 |
| 5,278,647 | 1/1994 | Hingorani et al. | 358/136 |
| 5,386,234 | 1/1995 | Veltman et al. | 348/409 |
| 5,461,420 | 10/1995 | Yonemitsu et al. | 348/401 |
| 5,491,516 | 2/1996 | Casavant et al. | 348/415 |
| 5,510,840 | 4/1996 | Yonemitsu et al. | 348/402 |
| 5,608,888 | 3/1997 | Purcell et al. | 395/412 |

FOREIGN PATENT DOCUMENTS

| 395 276 | 10/1990 | European Pat. Off. | H04N 5/84 |
| 2 240 232 | 7/1991 | United Kingdom | H04N 7/01 |
| WO 91/06182 | 5/1991 | WIPO | H04N 7/01 |
| WO 91/13520 | 9/1991 | WIPO | H04N 11/06 |

OTHER PUBLICATIONS

Woo Paik, "Digicipher—All Digital, Channel Compatible, HDTV Broadcast System," IEEE, 1990, vol. 36, No. 4, pp. 245–254.

*Primary Examiner*—Robert Chevalier
*Attorney, Agent, or Firm*—Limbach & Limbach L.L.P.

[57] ABSTRACT

A method for coding an input video signal to provide a coded signal. The input video signal has a field rate of 60 Hz and is derived from a motion picture film source using 2-3 pulldown. In the method, first frames, consisting of fields derived from different frames of the motion picture film source, are detected in the input video signal. Then, the input video signal is predictively coded to provide the coded signal by using second frames as reference pictures. Second frames are frames of the input video signal other than the first frames detected in the detecting step. In an alternative method for coding an input video signal to provide a coded signal, duplicate pictures are detected in the input video signal, and duplicate pictures are eliminated from the input video signal to provide an encoder input signal. The encoder input signal is predictively coded using plural predictive coding methods to provide the coded signal. Finally, a skip-picture flag is included in the coded signal in lieu of each eliminated duplicate picture, and a reference picture code identifying a field to be copied to provide each eliminated duplicate picture is also included in the coded signal.

2 Claims, 21 Drawing Sheets

|  | 0TH FIELD | | | 1ST FIELD | | | | 2ND FIELD | | | |
|---|---|---|---|---|---|---|---|---|---|---|---|
| INPUT | 0 | 1 | 2 | 3 | 4 | 5 | 6 | 7 | 0 | 1 | 2 | 3 |
| OUTPUT | 0 | | | | 4 | | | 5 | | 2 | 6 | | | | | 3 |
| LINE MEMORY A | | | | | 4 | 5 | | 7 | | | | |
| LINE MEMORY B | | 1 | | | | | 6 | | | 1 | | |
| LINE MEMORY C | | | 2 | | | | | | 0 | | | |
| LINE MEMORY D | | | | 3 | | | | | | | 2 | |

FIG.10

APPARATUS FOR CODING AND DECODING A DIGITAL VIDEO SIGNAL HAVING DUPLICATE PICTURES AND FRAMES WITH FIELDS ORIGINATING FROM DIFFERENT FILM SOURCE FRAMES

This is a continuation of application Ser. No. 08/124,299, filed Sep. 20, 1993.

FIELD OF THE INVENTION

This invention relates to an apparatus and method for coding a video signal derived from a motion picture film source in which the video signal includes duplicate pictures, and includes frames consisting of fields originating from different frames of the motion picture film source.

BACKGROUND OF THE INVENTION

The Motion Picture Experts Group (MPEG) standard is representative of a standard for compressing digital video signals for transmission or storage. The standard was discussed by ISO-IEC/JTC1/SC2/WG11 and has been proposed as a draft standard. The standard stipulates a hybrid compression method, combining motion compensated prediction coding with discrete cosine transform (DCT) coding.

The first compression technique, motion compensated prediction coding, takes advantage of the correlation of video signals in the time domain. According to this method, the video signal representing the current picture (a frame or a field) is predicted from the decoded and reproduced (reconstituted) video signal representing a reference picture, which is a picture that is earlier or later than the current picture. Only the motion prediction errors between the video signal representing the current picture and the reconstituted video signal representing the reference picture are transmitted or stored. This significantly reduces the amount of digital video signal required to represent the current picture.

The second compression technique, DCT coding, takes advantage of the intra-picture, two-dimensional correlation of a video signal. According to this technique, when a block of the current picture, or a block of motion prediction errors, is orthogonally transformed, signal power is concentrated in specific frequency components. Consequently, quantizing bits need only be allocated to the DCT coefficients in the region in which the signal power is concentrated. This further reduces the quantity of digital video signal required to represent the picture. For example, in a region in which the image has little detail, and in which the video signal is thus highly correlated, the DCT coefficients are concentrated at low frequencies. In that case, only the DCT coefficients in the low-frequency region of the distribution pattern are quantized to reduce the quantity of the digital video signal.

Because the coding techniques of the MPEG standard are basically intended for use with interlaced video signals, problems arise when they are applied without modification to progressive (non-interlaced) video signals. In particular, the compression ratio can be impaired when the MPEG techniques are applied to progressive video signals.

A motion picture consists of a sequence of still pictures reproduced in succession, normally 24 pictures per second. A motion picture film source, e.g., a motion picture film or a 24-frame video signal, represents each picture of the motion picture as a full frame with a frame rate of 24 Hz, whereas an interlaced video signal represents each picture of the motion picture as two consecutive fields, each field representing half of the picture and being displaced from one the other by one line. An NTSC interlaced video signal has a field rate of 60 Hz. Consequently, deriving an interlaced video signal with a field rate of 60 Hz from a motion picture film source with a frame rate of 24 Hz, such as is done by a telecine machine, requires a conversion between the number of frames per second of the film source and the number of fields per second in the video signal.

A motion picture film source with a 24 Hz frame rate is commonly converted to an interlaced video signal with a 60 Hz field rate, such as an NTSC video signal, by a technique known as 2-3 pull-down. FIG. 1 illustrates how 2-3 pull-down works.

The 2-3 pull-down process involves a repetitive sequence of deriving two fields of the video signal from the first of every two consecutive frames of the motion picture film source, and deriving three fields of the video signal from the second of the two consecutive frames of the film source. In FIG. 1, frames 1500 and 1501 are consecutive frames of a motion picture film source with a frame rate of 24 Hz. In the figure, each film source frame is divided into an odd field, indicated by a solid line, and an even field, indicated by a broken line.

First, two fields of the video signal are derived from the first film source frame 1500. The video field 1502, an odd field, is first derived from the first film source frame 1500, followed by the second video field 1503, an even field. Then, three fields of the video signal are derived from the second film source frame 1501. The video field 1504, an odd field, is first derived, followed by the video field 1505, an even field, followed by the video field 1506, another odd field. The two odd fields 1504 and 1506 are identical to one another. This process is repeated for the other two film source frames 1508 and 1509 from which the video fields 1510 through 1514 are derived. Note that an even field 1510 is derived first from the film source frame 1508, and that two even fields 1512 and 1514 are derived from the film source frame 1509. With the arrangement shown, a sequence of ten fields of the video signal is derived from a sequence of four frames of the motion picture film source, after which the sequence is repeated.

FIG. 2 shows the result of combining into frames consecutive pairs of fields of the interlaced video signal derived by the process shown in FIG. 1. The video fields 1600 and 1601 are derived from the same film source frame. Video fields 1602 and 1603 are also derived from the same film source frame. Hence, the video frame 1607, produced by combining the video fields 1600 and 1601, and the video frame 1608, produced by combining the video fields 1602 and 1603, are each derived from the same film source frame. On the other hand, the video frame 1609, produced by combining the consecutive video fields 1604 and 1605 is derived from two different film source frames.

When MPEG coding is applied to the frames of a non-interlaced video signal derived from an interlaced video signal, which, in turn, is derived a motion picture film source using 2-3 pulldown, coding the frames 1607 and 1608 in the above example presents no problems because these frames are each derived from a single film source frame, and are thus internally correlated. However, difficulties can be encountered when coding the video frame 1609 because it is derived from two different frames of the film source, and, hence, it is not necessarily internally correlated.

If the motion picture is fast-moving, or if a scene change occurs within the frame, a video frame derived from two different frames of the film source has low vertical correlation, which reduces the efficiency of DCT-based signal compression. Moreover, motion compensated prediction can also go wrong because of the reduced correlation of the video signal.

OBJECTS AND SUMMARY OF THE INVENTION

In view of the above-described status of the art, it is a principal object of the present invention to provide a method and a apparatus for coding with high efficiency an input video signal derived from a motion picture source using 2-3 pulldown; a method and a decoding apparatus for decoding a coded signal, as counterparts to the above-mentioned coding method and apparatus, and recording of a recording signal coded by the above-mentioned coding method.

Accordingly, the invention provides a method for coding an input video signal to provide a coded signal. The input video signal has a field rate of 60 Hz and is derived from a motion picture film source using 2-3 pulldown. In the method, first frames, consisting of fields derived from different frames of the motion picture film source, are detected in the input video signal. Then, the input video signal is predictively coded to provide the coded signal by using second frames as reference pictures. Second frames are frames of the input video signal other than the first frames detected in the detecting step.

The method may detect the first frames by detecting duplicate fields in the input video signal, the method may additionally eliminate the duplicate fields from the input video signal, and include in the coded signal a skip-picture flag in lieu of each eliminated duplicate field, and a reference picture code identifying a field to be copied to provide each eliminated duplicated field.

In an alternative method according to the invention for coding an input video signal to provide a coded signal, duplicate pictures are detected in the input video signal, and each duplicate picture is eliminated from the input video signal to provide an encoder input signal. The encoder input signal is predictively coded using plural predictive coding methods to provide the coded signal. Finally, a skip-picture flag is included in the coded signal in lieu of each eliminated duplicate picture, and a reference picture code identifying a field to be copied to provide each eliminated duplicate picture is also included in the coded signal.

The invention additionally provides a method for decoding a coded signal to provide an output video signal. The coded signal is derived by applying predictive coding to an input video signal having a field rate of 60 Hz and being derived from a motion picture film source using 2-3 pulldown. The predictive coding is applied such that frames of the input video signal consisting of fields derived from different frames of the motion picture source are coded using field mode coding, and all other frames of the input video signal are coded using frame mode coding. The coded video signal includes a processing mode flag signal indicating a coding mode for each frame. In the method, the processing mode flag for each frame is extracted from the coded signal, and inverse predictive coding is applied to the coded signal to provide the output video signal. The inverse predictive coding for each frame has the coding mode indicated by the processing mode flag extracted from the coded signal.

In an alternative method according to the invention for decoding a coded signal to provide an output video signal. The coded signal is generated by eliminating duplicate pictures from an input video signal. The coded signal includes, in lieu of each eliminated duplicate picture, a skip-picture flag, and a reference picture code identifying a picture to be copied to provide the eliminated duplicate picture. In the method, the skip picture flag and the reference picture code are extracted from the coded video signal, inverse predictive coding is applied to the coded signal to provide the output video signal. Finally, the picture indicated by the reference picture code is copied in response to the skip picture flag to restore an eliminated duplicate picture to the output video signal.

The invention additionally provides a recording, comprising recording medium and a recording signal recorded in the recording medium. The recording signal includes a video input signal derived from a motion picture film source and coded by predictive coding using as reference pictures only frames of the input video signal that consist of fields derived from the same frame of the motion picture source.

An alternative recording according to the invention comprises a recording medium; and a recording signal recorded in the recording medium. The recording signal includes a coded video input signal wherefrom duplicate pictures are eliminated, and also includes in lieu of each eliminated duplicate picture, a skip picture flag and a picture reference code identifying a field to be copied to restore the eliminated duplicate picture.

The invention additionally provides an apparatus for coding an input video signal to provide a coded signal. The input video signal has a field rate of 60 Hz and is derived from a motion picture film source using 2-3 pull-down. The apparatus comprises a circuit that detects first frames in the input video signal. First frames consist of fields derived from different frames of the motion picture film source. The apparatus also comprises a predictive coding circuit that provides the coded signal by predictively coding the input video signal. The predictive coding circuit uses second frames as reference pictures. Second frames are frames of the input video signal other than the first frames detected by the detecting circuit.

An alternative apparatus according to the invention for coding an input video signal to provide a coded signal comprises a detecting circuit that detects duplicate pictures in the input video signal. A circuit eliminates each detected duplicate picture from the input video signal to provide an encoder input signal. A predictive coding circuit predictively codes the encoder input signal using plural predictive coding methods to provide the coded signal. Finally, a circuit includes a skip-picture flag in the coded signal in lieu of each eliminated duplicate picture, and additionally includes in the coded signal a reference picture code identifying a field to be copied to provide each eliminated duplicate picture.

The invention additionally provides an apparatus for decoding a coded signal to provide an output video signal. The coded signal is derived by applying predictive coding to an input video signal having a field rate of 60 Hz. The input video signal is derived from a motion picture film source by 2-3 pull-down. The predictive coding is applied such that frames of the input video signal consisting of fields derived from different frames of the motion picture source are coded using field mode coding, and all other frames of the input video signal are coded using frame mode coding. The coded video signal includes a processing mode flag signal indicating a coding mode for each frame. The apparatus comprises and extracting circuit that extracts the processing mode flag for each frame from the coded signal. The apparatus additionally comprises a circuit that applies inverse predictive coding to the coded signal to provide the output video signal. The inverse predictive coding applied to each frame has the coding mode indicated by the processing mode flag extracted by the extracting circuit.

The invention also provides an alternative decoding apparatus for decoding a coded signal to provide an output video signal. The coded signal is generated by eliminating duplicate pictures from an input video signal, and includes a skip-picture flag in lieu of each eliminated duplicate picture, and a reference picture code identifying a field to be copied to provide the eliminated duplicate picture. The decoding apparatus comprises a circuit that extracts the skip picture flag and the reference picture code from the coded signal and a circuit that applies inverse predictive coding to the coded signal to provide the output video signal. The apparatus additionally comprises a circuit that copies, in response to the skip picture flag, the picture indicated by the reference picture code to restore an eliminated duplicate field to the output video signal. The invention additionally provides a system for deriving a recording signal from an input video signal and for reproducing the recorded signal to provide an output video signal. The recording signal has a bit rate substantially lower than the input video signal and the output video signal. The input video signal and the output video signal have a field rate of 60 Hz, and the input video signal is derived from a motion picture film source using 2-3 pull-down. The system comprises an encoding apparatus and a decoding apparatus.

The encoding apparatus comprises a circuit that detects first frames in the input video signal. First frames consist of fields derived from different frames of the motion picture film source. The encoding also includes a predictive coding circuit that predictively codes the video input signal to provide the recording signal. The predictive coding circuit codes each first frame using field mode coding and codes each second frame using frame mode coding. A second frame is a frame of the input video signal other than a first frame detected by the detecting circuit. Finally the encoding apparatus comprises a circuit that includes in the recording signal a processing mode flag indicating a coding mode for each frame of the input video signal.

The decoding apparatus comprises a circuit that extracts the processing mode flag for each frame from the recording signal. The decoding apparatus also includes a circuit that applies inverse predictive coding to the recording signal to provide the output video signal. The inverse predictive coding applied to each frame has the coding mode indicated by the processing mode flag extracted by the extracting circuit.

The invention finally provides an alternative system for deriving a recording signal from an input video signal and for reproducing the recorded signal to provide an output video signal. The recording signal has a bit rate substantially lower than the input video signal and the output video signal. The system comprises an encoding apparatus and a decoding apparatus.

The encoding apparatus comprises a circuit that detects duplicate pictures in the input video signal and a circuit that eliminates each duplicate picture from the input video signal to provide an encoder input signal. A predictive coding circuit predictively codes the encoder input signal using plural predictive coding methods to provide the recording signal. The encoding apparatus additionally comprises a circuit that includes a skip-picture flag in the recording signal in lieu of each eliminated duplicate picture, and that additionally includes in the recording signal a reference picture code identifying a field to be copied to provide each eliminated duplicate picture.

The decoding apparatus comprises a circuit that extracts the skip picture flag and the reference picture code from the recording signal, and a circuit that applies inverse predictive coding to the recording signal to provide the output video signal. Finally, the decoding apparatus comprises a circuit that copies, in response to the skip picture flag, the picture indicated by the reference picture code to restore an eliminated duplicate field to the output video signal.

BRIEF DESCRIPTION OF THE DRAWINGS

FIG. 10 illustrates the scan conversion operation of the present embodiment.

DETAILED DESCRIPTION OF THE INVENTION

Preferred embodiments of the present invention will be described in detail with reference to the drawings.

Figure 1:
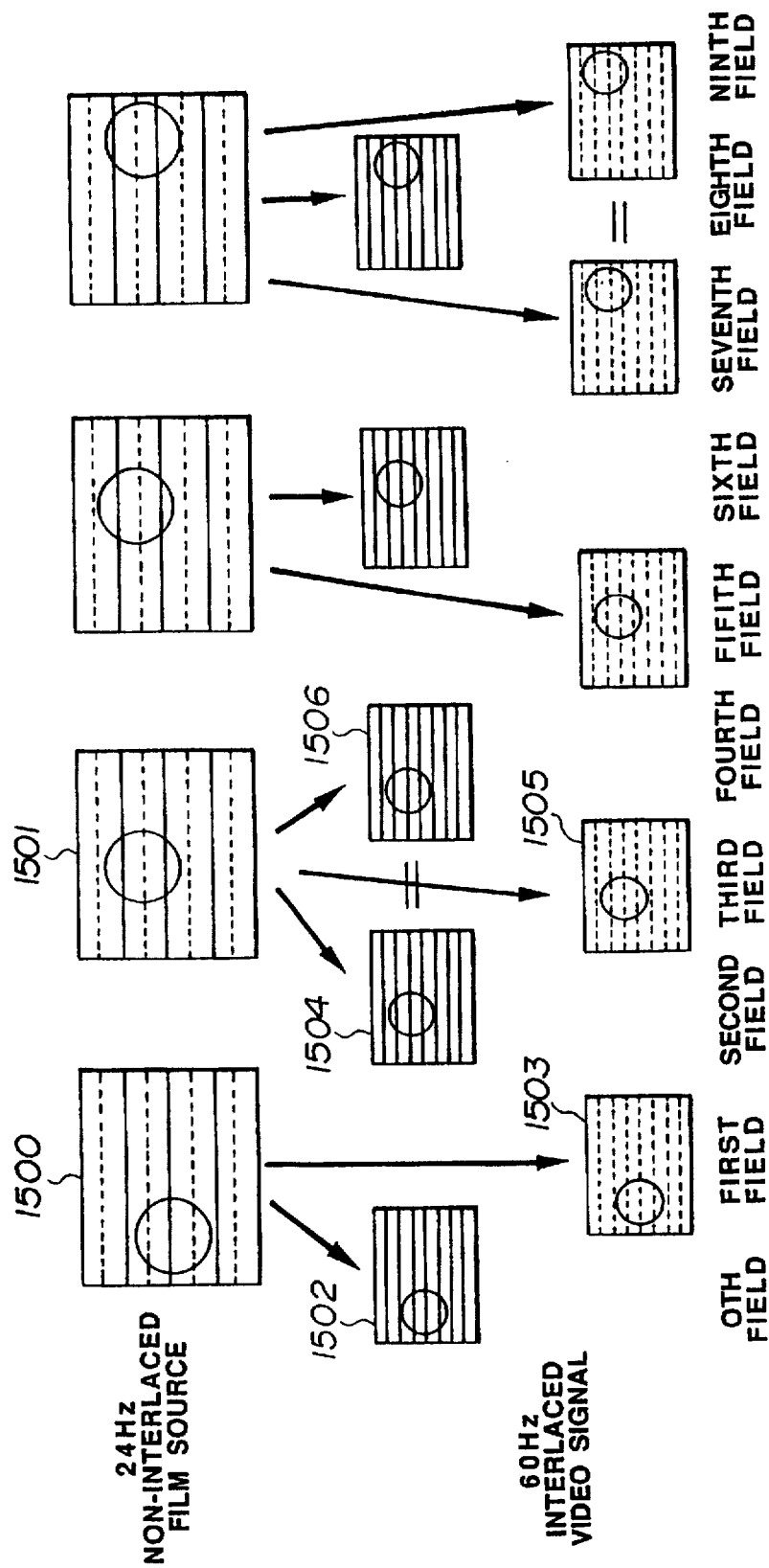
FIG. 1 illustrates the principle of the 2-3 pull-down.
Figure 2:
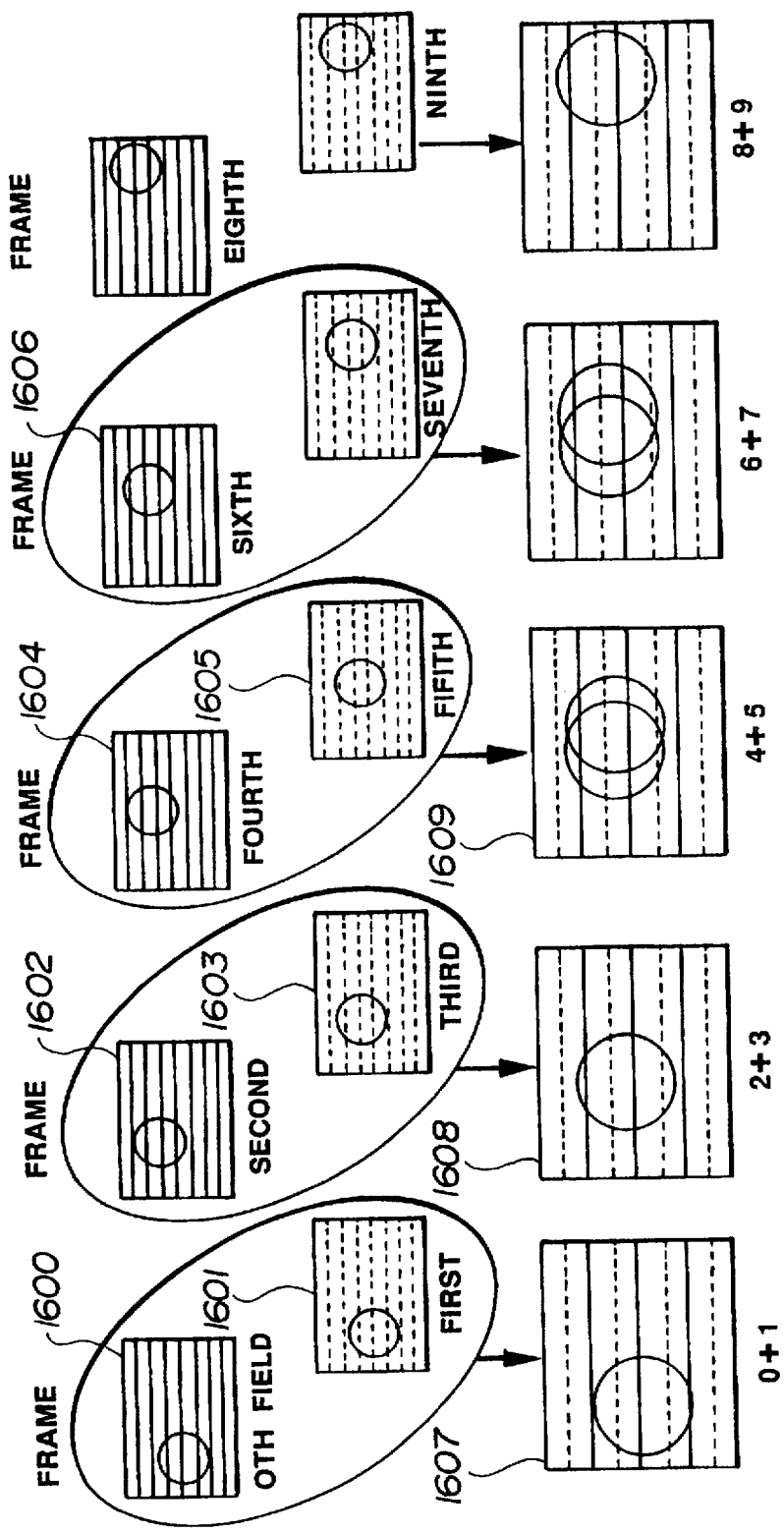
FIG. 2 illustrates how the coding efficiency is reduced in a frame derived by 2-3 pull-down from different motion picture film source frames.
Figure 3:
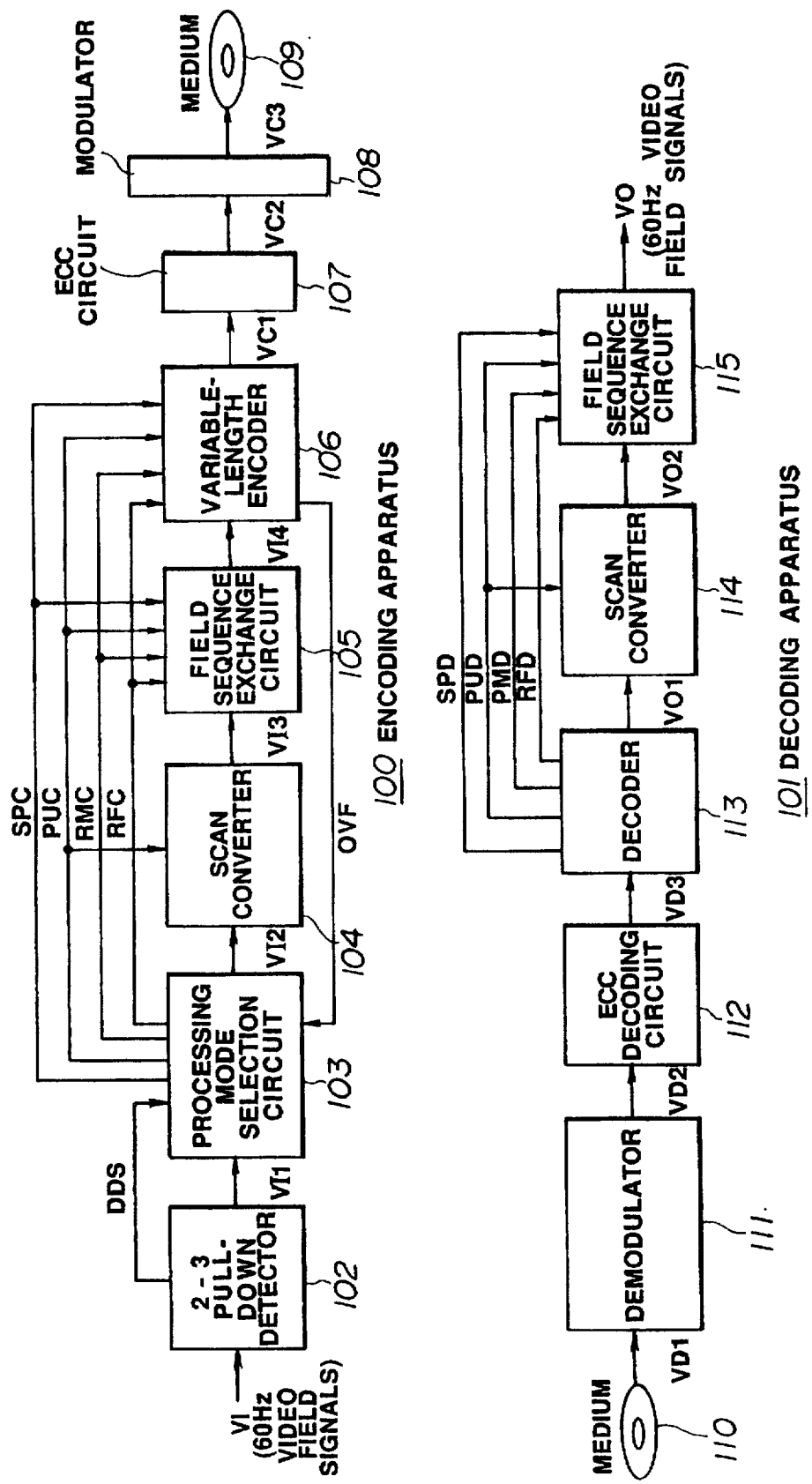
FIG. 3 is a block diagram showing the coding apparatus and the decoding apparatus in a first embodiment of the present invention.

FIG. 3 shows the coding apparatus 100 and the decoding apparatus 101 that form the video signal processing apparatus according to the first embodiment of the present invention. The coding apparatus 100 embodying the first aspect of the present invention includes the 2-3 pull-down detection circuit 102 for detecting duplicate fields in the coder input signal VI, a video signal having a field rate of 60 Hz that is derived from a motion picture film source by 2-3 pull-down. The 2-3 pull-down detection circuit 102 generates the duplication detection signal DDS, and delays the coder input signal VI by a predetermined processing time to generate the video signal VI1.

The coding apparatus 101 also includes the processing mode selecting circuit 103 which generates, in response to the duplication detection signal DDS, the overflow signal OVF from the variable-length coder 106, and the video signal VI1, the following control signals and flags for each picture in the coder input signal VI:

- the skip picture flag SPC that indicates whether the picture is a duplicate picture;
- the processing unit flag PUC that indicates whether the picture is to be coded using field-mode or frame-mode coding;
- the prediction mode code PMC, which indicates the prediction mode for coding the picture, i.e., whether the picture is to be coded as an I-picture (no prediction), a P-picture (forward prediction from an earlier reference picture), or a B-picture (backward prediction from a later reference picture, linear prediction between earlier and later reference pictures, or forward prediction from an earlier reference picture); and
- the reference picture code RFC that indicates, when the picture is a skip picture, the picture (field or frame) that will be used as the reference picture for reproducing the skip picture.

The processing mode selecting circuit 103 additionally delays the video signal VI1 by a predetermined processing time to generate the video signal VI2.

The coding apparatus 100 also includes the scan converter 104 that converts two interlaced fields of the video signal VI2 into a progressive frame when the processing unit flag PUC indicates that the picture is to be coded using frame mode coding. Otherwise, when the processing unit flag PUC indicates that the picture is to be coded using field mode coding, the scan converter 104 supplies the two fields of the video signal VI2 unmodified as two fields of the video signal VI3.

The field sequence exchange circuit 105 receives the video signal VI3 and changes the picture sequence of the video signal VI3 to the sequence required by the encoder 106 in response to the skip picture flag SPC, the processing unit flag PUC, the prediction mode code PMC, and the reference picture code RFC generated by the processing mode selecting circuit 103. The field sequence exchange circuit 105 provides the resulting sequence exchanged video signal as the video signal VI4.

The encoder 106 codes the video signal VI4 in response to the skip picture flag SPC, the prediction mode code PMC, and the reference picture code RFC generated by the processing mode selecting circuit 103, to generate the coded signal VC1. The error correction coding (ECC) circuit 107 appends error correction codes to the encoded signal VC1 to generate the encoded signal VC2, which passes to the modulating circuit 108 where it is modulated to provide the recording signal VC3 for recording on the recording medium 109.

The decoding apparatus 101 of the first embodiment of the invention includes the demodulating circuit 111 for demodulating the signal VD1 reproduced from the recording medium 110 to provide the decoded signal VD2. The recording medium 110 is the same as, or is derived from, the recording medium 109. The decoded signal VD2 passes to the error correction code decoder (ECC decoder) 112, which detects and corrects errors in the decoded signal VD2 to provide the decoder input signal VD3. The decoder 113 extracts from the decoder input signal VD3 the skip picture flag SPC, the processing unit flag PUC, the prediction mode code PMC, and the reference picture code RFC that were generated by the processing mode selecting circuit 103, and provides these flags and codes as the skip picture flag SPD, the processing unit flag PUD, the prediction mode code PMD, and the reference picture code RFD, respectively. The decoder 113 also decodes the coded picture signals in the decoder input signal VD3 in response to these flags and codes to provide the decoder output signal VO1.

The scan converting circuit 114 converts one frame of the decoder output signal VO1 into two fields of the video signal VO2 when the processing unit flag PUD from the decoder 113 indicates that the frame was processed in frame mode. Otherwise, when the processing unit flag PUD from the decoder 113 indicates that the frame was processed in field mode, the scan converting circuit 114 supplies the video signal Vo1 unmodified as two fields of the video signal VO2.

The sequence exchange circuit 115 restores the picture sequence of the video signal VO2 to the picture sequence of the coder input signal VI to provide the decoder apparatus output signal VO. The sequence exchange circuit 115 changes the picture sequence in response to the skip picture flag SPD, the processing unit flag PUD, the prediction mode code PMD, and the reference picture code RFD from the decoder 113. The resulting decoding apparatus output signal VO is a video signal that is suitable for display on a monitor after conversion to an analog signal.

The coding apparatus 100 according to the first embodiment of the invention will now be described in detail. The coder input signal VI, a video signal with a 60 Hz field rate, is fed into the 2-3 pull-down detection circuit 102. The 2-3 pull-down detection circuit 102 detects each duplicate field in the coder input signal VI, and generates the duplication detection signal DDS in response thereto. The 2-3 pull-down detection circuit 102 also delays the coder input signal VI by a time corresponding to the processing delay of the 2-3 pull-down detection circuit before feeding the delayed coder input signal VI out as the video signal VI1.

The processing mode selecting circuit 103 derives four signals for each picture in the video signal VI1 in response to the video signal VI1 and the duplication detection signal DDS. These signals are:

- the skip picture flag SPC, which indicates whether the picture is a duplicate picture (field or frame). A duplicate picture is one with little or no temporal change relative to another picture;
- the processing unit flag PUC, which indicates whether the picture is to be coded using field-mode coding or frame-mode coding;
- the prediction mode code PMC, which indicates the prediction mode for coding the picture, i.e., whether the picture is to be coded as an I-picture (no prediction), a P-picture (forward prediction from an earlier reference picture), or a B-picture (backward prediction from a later reference picture, linear prediction between earlier and later reference pictures, or forward prediction from an earlier reference picture); and the reference picture code RFC, which indicates, when the picture is a skip picture, the picture to be used as the reference picture for reproducing the skip picture.

The processing mode selecting circuit 103 delays the video signal VI1 by a time equal to the processing time of the processing mode selecting circuit before feeding the video signal VI1 out as the video signal VI2.

If the processing unit flag PUC generated by the processing mode selection circuit 103 indicates that a picture will be coded in frame mode, the scan converting circuit 104 interleaves the two fields of the field-based video signal VI2 into a single frame, which it feeds out as a picture of the video signal VI3. If the processing unit flag PUC indicates that a picture will be coded in field mode, the processing mode selection circuit feeds the two fields of the video signal VI2 out unchanged as two fields of the video signal VI3. The sequence exchange circuit 105 changes the picture (field or frame) sequence of the video signal VI3 to provide the encoder input signal VI4 with the picture sequence required by the encoder 106. The sequence exchange circuit changes the picture sequence in response to the skip picture flag SPC, the processing unit flag PUC, the prediction mode code PMC, and the reference picture code RFC.

The encoder 106 encodes the encoder input signal VI4 in response to the skip picture flag SPC, the processing unit flag PUC, the prediction mode code PMC, and the reference picture code RFC, received from the processing mode selecting circuit 103, and provides the encoder output signal VC1.

The ECC circuit 107 appends error correction codes to the encoder output signal VC1 to provide the encoded signal VC2, which the modulating circuit 108 modulates to provide the recording signal VC3 for recording by a recording apparatus, not shown, on the recording medium 109.

The decoding apparatus 101 will now be described in detail. The recording signal VD1, read out from the recording medium 110, is demodulated by the demodulating circuit 111 to provide the demodulated signal VD2. The ECC decoding circuit 112 applies error detection and correction to the demodulated signal VD2 to generate the decoder input signal VD3.

The decoder input signal VD3 is fed into the decoder 113, which extracts from the signal VD3 the skip picture flag SPC, the processing unit flag PUC, the prediction mode code PMC, and the reference picture code RFC that were generated by the processing mode selecting circuit 103, and provides them as the skip picture flag SPD, the processing unit flag PUD, the prediction mode code PMD, and the reference picture code RFD. The decoder 113 also decodes the coded picture signals in the decoder input signal VD3 to provide the decoder output signal VO1.

The scan converting circuit 114 converts one frame of the video signal VO1 into two fields of the video signal VO2 when the processing unit flag PUD from the decoder 113 indicates that the frame was processed in frame mode. Otherwise, the scan converting circuit 114 supplies two fields of the video signal VO1 without modification as two fields of the video signal VO2.

The sequence exchange circuit 115 restores the picture sequence of the video signal VO2 to the picture sequence of the coder input signal VI to provide the decoder apparatus output signal VO. The sequence exchange circuit 115 changes the picture sequence in response to the skip picture flag SPD, the processing unit flag PUD, prediction mode code PMD, and the reference picture code RFD from the decoder 113. This permits the recording signal to be reproduced from the recording medium 110.

Figure 4:
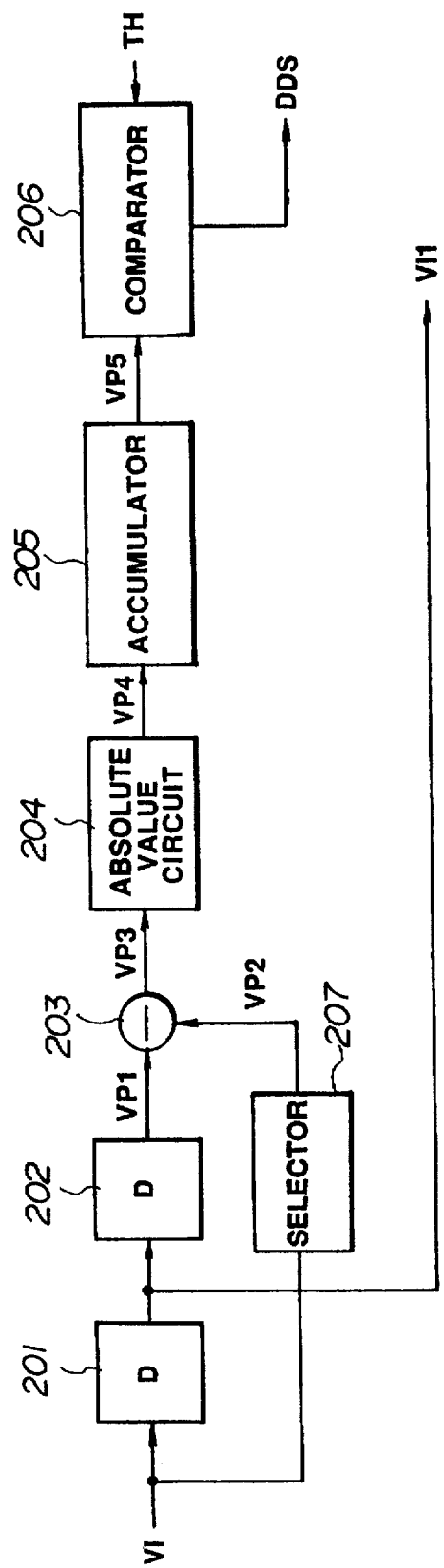
FIG. 4 is a block diagram showing the construction of the 2-3 pull-down detection circuit of the encoding apparatus according to the present invention.

The coding apparatus 100 will now be described in more detail. Operation of the 2-3 pull-down detection circuit 102 will be described first with reference to FIGS. 4 and 5. In FIG. 4, the coder input signal VI, a video signal with a field rate of 60 Hz, is fed into the selector 207 which extracts the even fields from the coder input signal to provide the video signal VP2. The video signal VP2 is fed into the subtractor 203. The coder input signal VI is delayed by two field periods by the field delay circuits 201 and 202 and is also fed to the subtractor 203. The subtractor 203 calculates a pixel-by-pixel difference between the coder input signal delayed by two fields VP1, and the video signal VP2 from the selector 207, and feeds the resulting difference signal VP3 to the absolute value circuit 204.

The absolute value circuit 204 determines the absolute value of each difference value in the difference signal VP3, and passes the result as the signal VP4 to the accumulator 205, which calculates the sum of the absolute values of the differences for each field, and passes the resulting difference absolute value sum for each field VP5 to the comparator 206.

The comparator 206 compares the value of the difference absolute value sum for each field VP5 to a threshold value TH. If the comparator 206 determines that the difference absolute value sum is less than the threshold value TH, the comparator generates the duplication detection signal DDS to indicate that the field of the coder input signal VI is a duplicate field.

Figure 5:
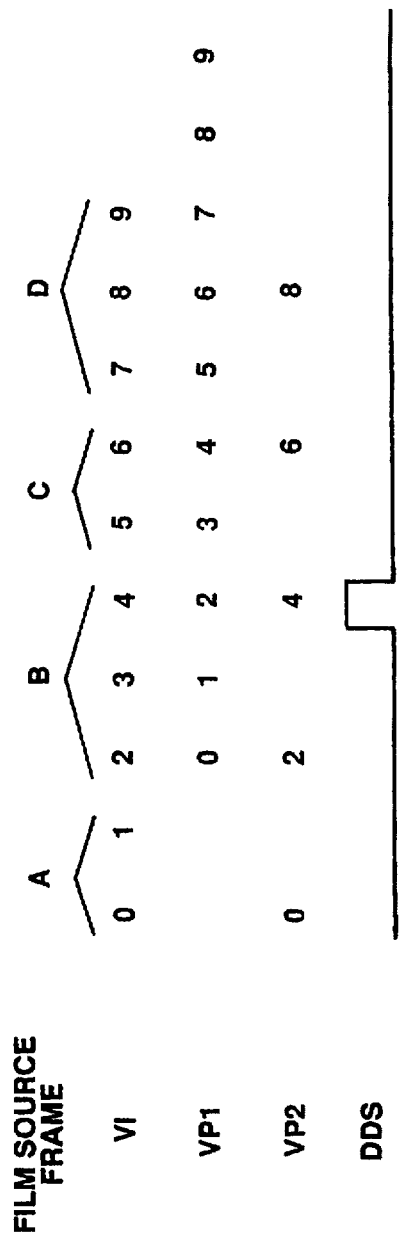
FIG. 5 illustrates the timing of the duplication detection signal in the 2-3 pull-down detection circuit.

FIG. 5 illustrates the way in which the 2-3 pull-down detection circuit 102 generates the duplication detection signal DDS. In FIG. 5, the coder input signal VI, a video signal with a 60 Hz field rate, is derived from the frames of a motion film source using 2-3 pull down. The odd field 0 and the even field 1 of the coder input signal VI are both derived from the film source frame A, whereas the odd fields 2 and 4 and the even field 3 of the coder input signal VI are all derived from the film source frame B. The even field 5 and the odd field 6 of the coder input signal VI are both derived from the film source frame C, whereas the even fields 7 and 9 and the odd field 8 of the coder input signal VI are all derived from the film source frame D.

FIG. 5 also shows the timing of the video signal VP1 delayed by two fields relative to the coder input signal VI, and the video signal VP2 consisting of only the even fields of the coder input signal VI as they are supplied to the subtractor 203. As a result, the subtractor 203 only generates differences for even fields. When field 2 of the coder input signal enters the subtractor 203 via the delayed video signal VP1 and field 4 of the coder input signal simultaneously enters the subtractor 203 via the video signal VP2, the differences calculated by the subtractor will be small because field 2 and field 4 of the coder input signal originate from the same film source frame. Consequently, the difference absolute value sum VP5 from the accumulator 205 will be less than the threshold value TH, and the comparator 206 will generate the duplication detection signal DDS.

The 2-3 pull-down detection circuit 102 additionally feeds the video signal VI1, which is delayed by one field period relative to the coder input signal VI, to the processing mode selection circuit 103.

Figure 6:
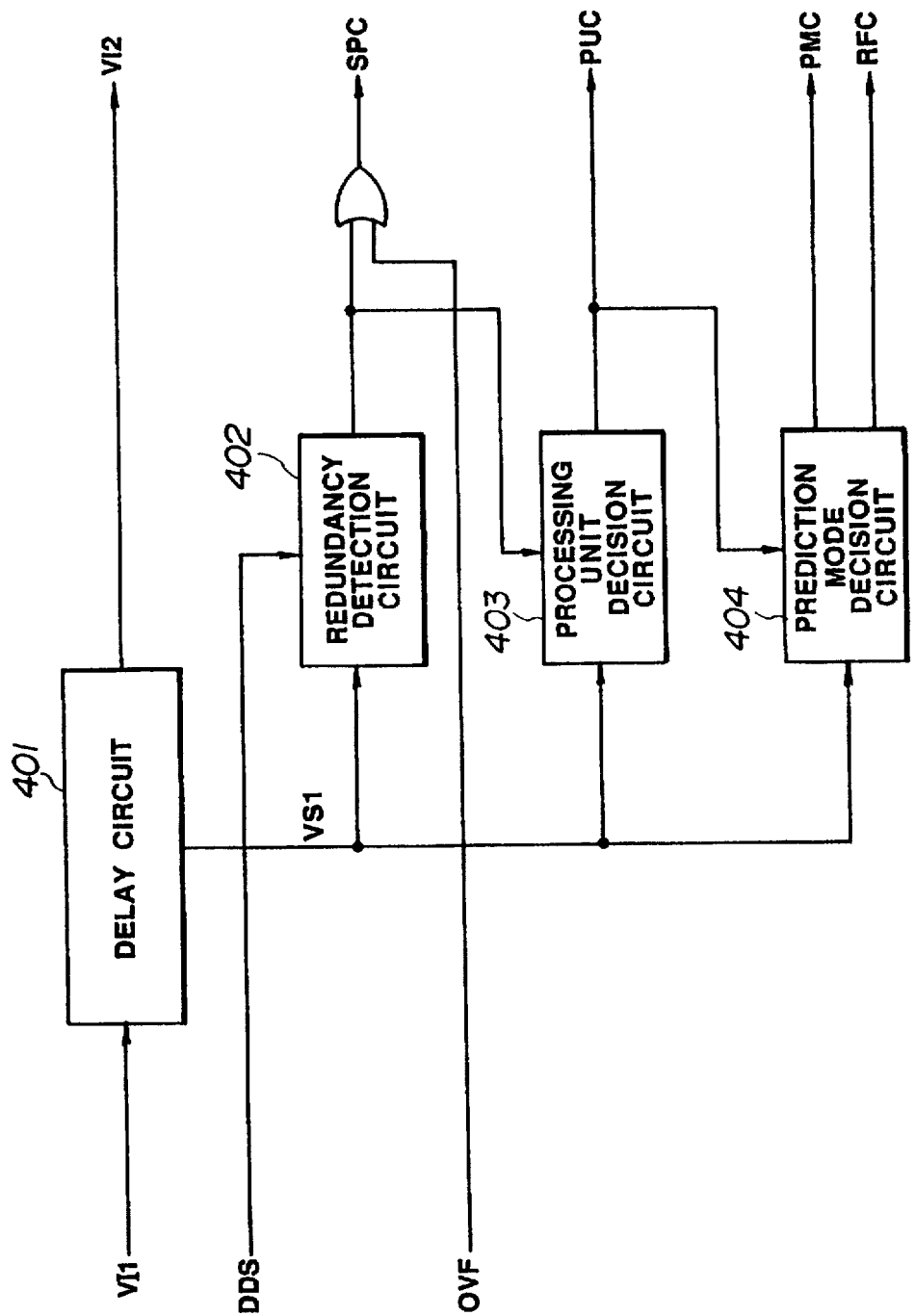
FIG. 6 is a block diagram of the processing mode selection circuit in the coding apparatus according to the present invention.

Operation of the processing selection circuit 103 will now be described with reference to FIGS. 6 through 8. FIG. 6 shows the arrangement of the processing mode selection circuit 103 in which the video signal VI1 is supplied to the delay circuit 401. The delay circuit 401 delays the video signal VI1 by different multiples of a field period and feeds multiple delayed signals out as the video signal VS1. Additionally, the delay circuit 401 delays the video signal VI1 by the processing time required by the processing mode selection circuit 103 and supplies the delayed video signal VI1 as the video signal VI2 to the scan conversion circuit 104.

In the processing mode selection circuit 103, the redundancy detection circuit 402 detects duplicate pictures (field or frame) in the video signal VI1 by comparing the current picture with various other pictures in the video signal VS1. A duplicate picture is a picture that exhibits little or no change relative to another picture. The processing mode selection circuit 103 generates the skip picture flag SPC in response to detected duplicate pictures. Additionally, the processing mode selection circuit 103 generates the skip picture flag SPC in response to duplicate pictures indicated by the duplication detection signal DDS.

Figure 7:
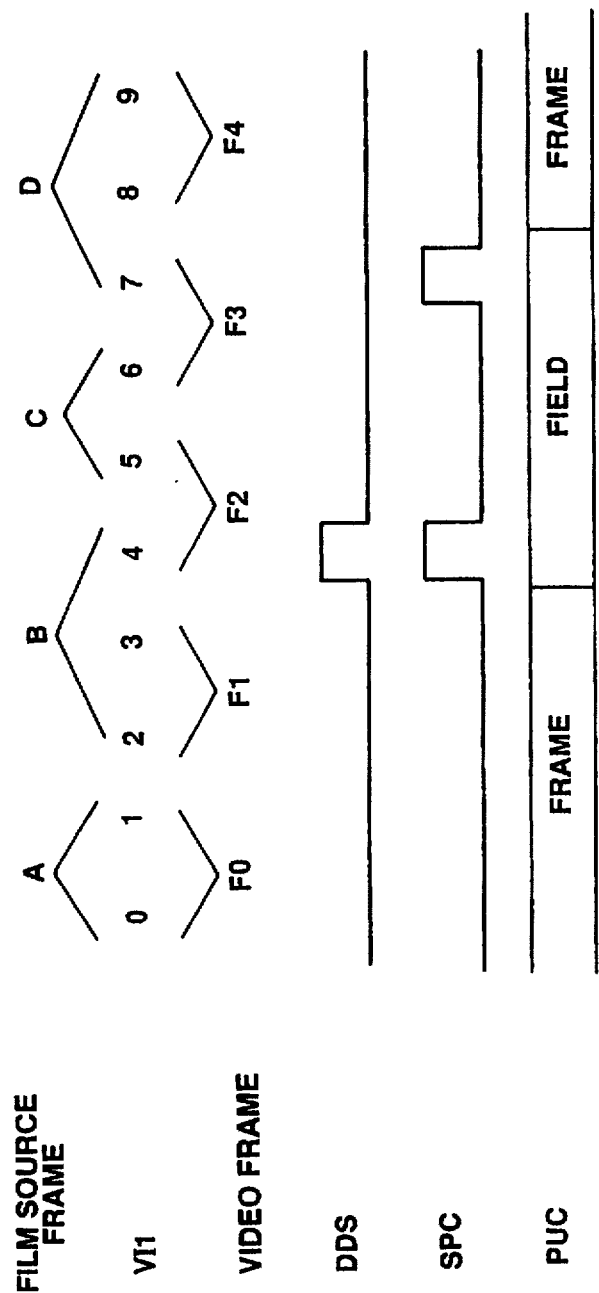
FIG. 7 illustrates the timing of the signals generated by the processing mode selection circuit in the coding apparatus according to the present invention.

FIG. 7 illustrates the timing of the skip picture flag SPC when a duplicate field is detected. In FIG. 7, fields 0 through 9 of the video signal VI1, which has a field rate of 60 Hz, are derived from frames A through D of a motion picture film source, as described above with reference to FIG. 5. The fields of the video signal VI1 are then formed into frames as follows: the frame F0 is made up of fields 0 and 1, the frame F1 is made up of fields 2 and 3, the frame F2 is made up of fields 4 and 5, the frame F3 is made up of fields 6 and 7, and the frame F4 is made up of fields 8 and 9.

In the example shown, the redundancy detection circuit 402 generates the skip picture flag SPC for field 4, a duplicate field indicated by the duplicate detection signal DDS, and for field 7, a duplicate field that duplicates field 9, and which is detected by the redundancy detection circuit 402. The skip picture flag for field 4 is generated in response to the duplication detection signal DDS.

The processing mode selection circuit 103 also generates the skip picture flag SPC when it receives the overflow flag OVF from the encoder 106. The overflow flag will be described further below. This is achieved by the OR gate 405, which performs an OR operation between the output of the redundancy detection circuit 402 and the overflow flag OVF. As mentioned above, the redundancy detection circuit 402 also generates the skip picture flag SPC if a picture is designated as a skip picture by the duplicate detection signal DDS. The encoder 106 includes the skip picture flag SPC and the reference picture code RFC in the coding apparatus output signal VC1 in lieu of each duplicate picture, as will be described below.

Returning to FIG. 6, the processing unit decision circuit 403 generates the processing unit flag PUC in response to the delayed video signal VS1 from the delay circuit 401, and in response to the skip picture code SPC from the redundancy detection circuit 402. In the example shown in FIG. 7, the processing unit flag PUC indicates that frames F2 and F3 are to be coded in field mode since each field in the frames F2 and F3 is derived from a different film source frame. The processing unit flag PUC indicates that the other frames F0, F1, and F4 are to be coded in frame mode.

The prediction mode decision circuit 404 generates the prediction mode code PMC indicating the prediction mode of each picture, and, in response to the skip picture flag, generates the reference picture signal RFC indicating the picture that will be used as the reference picture for reproducing the skip picture.

Prediction mode will now be explained with reference to FIG. 8. In FIG. 8, the frame B2, made up of fields b20 and b21, and the frame B3, made up of fields b30 and b31, each include fields derived from different film source frames, as described above. Therefore, the prediction mode decision circuit 404 sets the prediction mode code PMC so that these frames will not be used as reference pictures for prediction.

Figure 8:
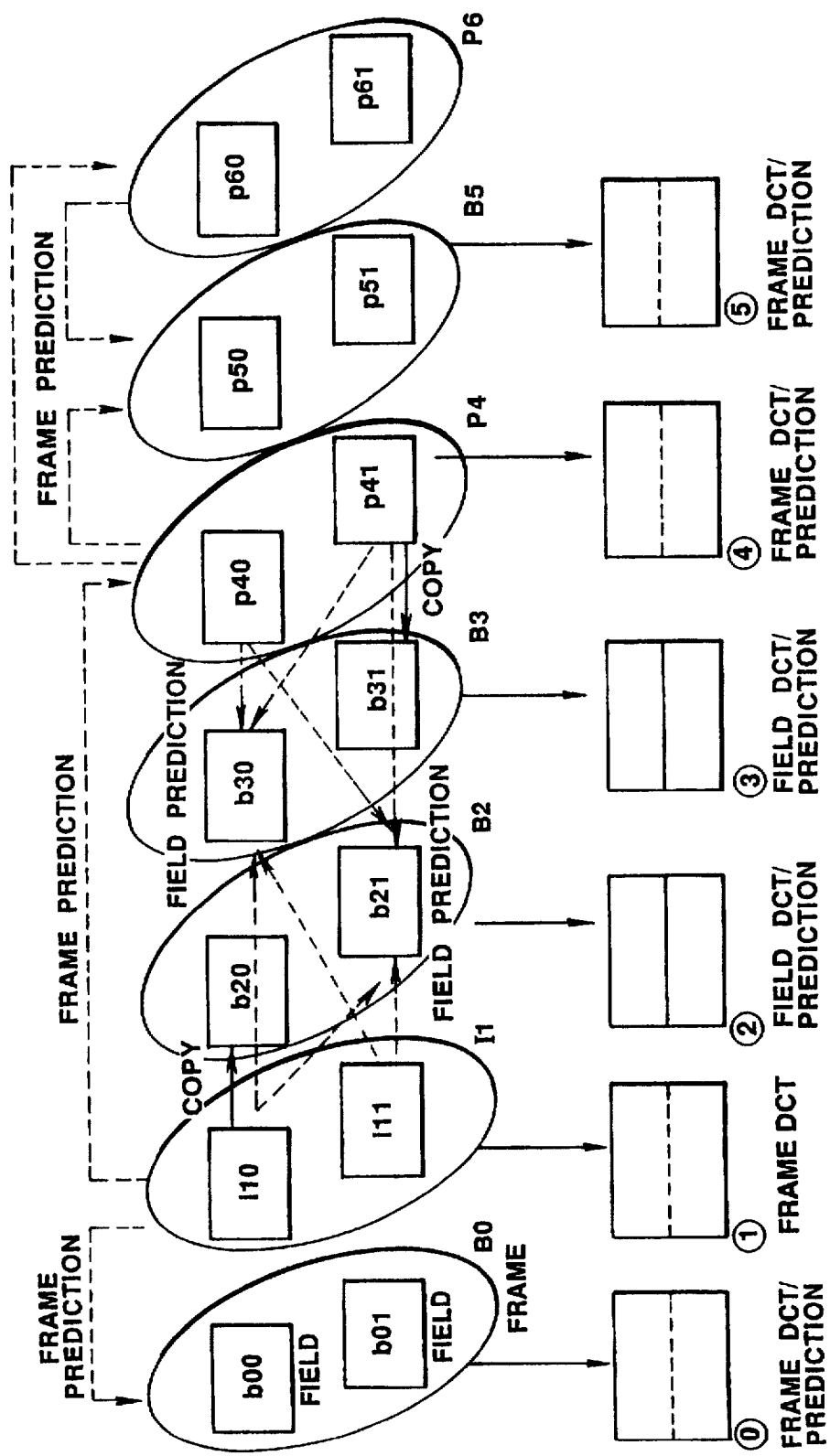
FIG. 8 illustrates prediction.

When the frame is composed of fields p40 and p41, as shown in FIG. 8, the prediction mode PMC is set to indicate that the frame is predicted as a P-picture with the earlier fields i10 and i11 as the reference picture.

Since the field b20 is a field derived from the same motion picture film source frame as the field i10, and the field b31 is a field derived from the same motion picture film source frame as the field p41, the fields b20 and b31 are designated as skip pictures, and are not separately coded.

Additionally, the prediction mode code for the fields b21 and b30 may be set to indicate that the fields will be predicted as B-pictures from the frame of earlier fields i10 and i11 and/or the frame of later fields p40 and p41 by one of three possible prediction modes, as will be described next.

The prediction mode code PMC, indicating the prediction mode used for coding each picture in the present embodiment, will now be described. The prediction mode code PMC has three possible states to denote the three possible prediction modes for coding each picture:

No prediction. The picture is coded by itself, without reference to other pictures (I-picture).

Forward prediction from an earlier reference picture (P-picture).

Bidirectional prediction, which can be from an earlier reference picture, a later reference picture, or by linear interpolation between an earlier reference picture and a later reference picture (B-picture).

The possible motion prediction modes for each macroblock of a B-picture are as follows: (i) backward prediction from a later picture; (ii) linear prediction from both later and earlier pictures, in which a reference macroblock from the later picture and a reference macroblock from the earlier picture are processed with linear processing from pixel to pixel, such as by a mean value calculation, to provide a reference macroblock from which the macroblock of the current picture is predicted; and (iii) forward prediction from an earlier picture.

The reference picture code RFC indicates the picture that is to be used as the reference picture for reproducing the skip picture.

Figure 9:
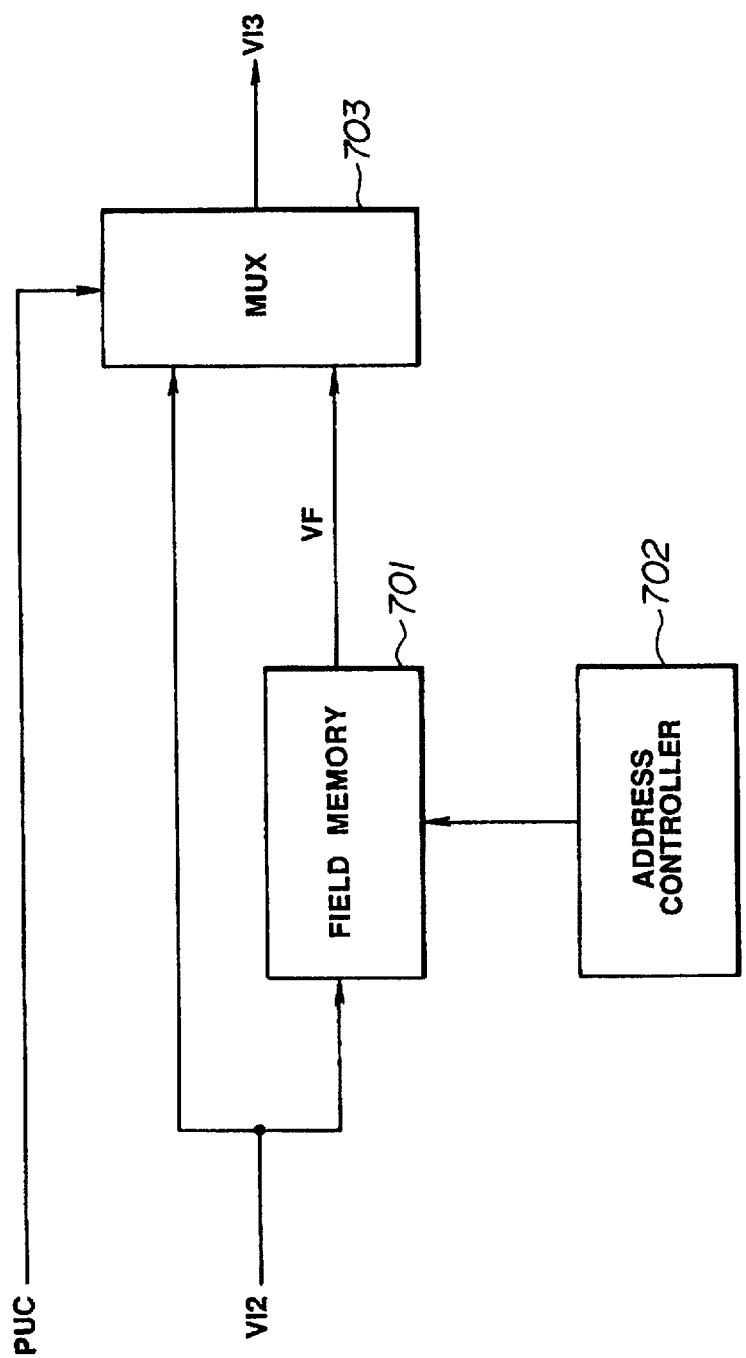
FIG. 9 is a block diagram showing the field sequence exchanging circuit in the coding apparatus according to the present invention.
Figure 11:
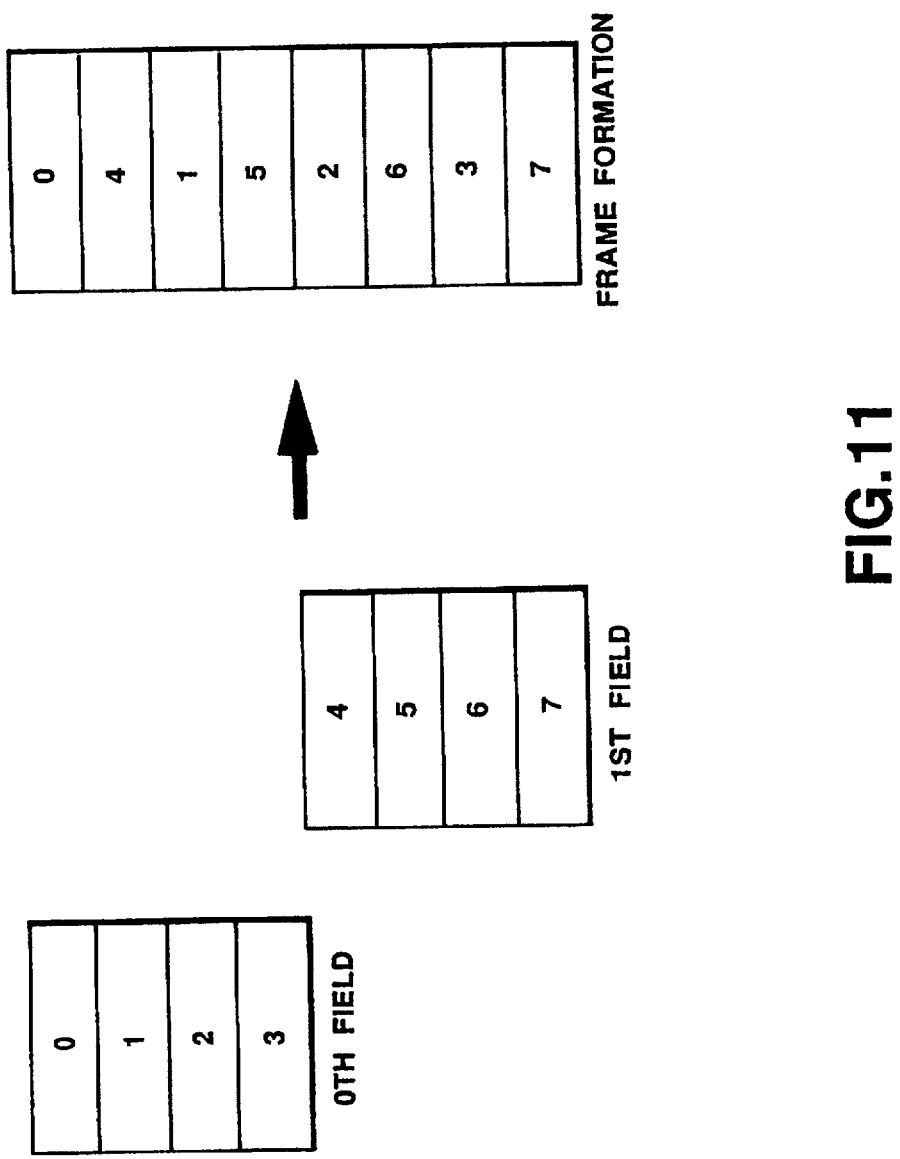
FIG. 11 illustrates frame formation.

The operation of the scan converting circuit 104 will now be described with reference to FIGS. 9 through 11. The scan converting circuit 104 is made up of a field memory 701 which stores the video signal VI2 from the processing mode selection circuit, the address controller 702, and the multiplexer 703, as shown in FIG. 9. The address controller 702 stores a number of addresses equal to the number of lines in a field and causes the video signal to be read out of the field memory 701 in a specified order to generate the frame-based video signal VF. In response to the processing unit flag PUC. The multiplexer 703 feeds out as the video signal VI3 the field-based video signal VI2 when the processing unit flag PUC indicates field mode coding, and the frame-based video signal VF when the processing unit flag PUC indicates frame mode coding.

In the following detailed explanation of the operation of the scan converting circuit 104, it will be assumed for simplicity sake that each field is made up of four lines. In this instance, conversion from two fields to one frame is carried out as shown in FIGS. 9 through 11.

Referring to FIGS. 9 and 10, lines 0 through 3 of field 0 are sequentially written in the line memories A through D of the field memory 701. In response to an address from address controller 702, line 0 is then fed to the output from line memory A, and line 4 of field 1 is immediately written into line memory A. This operation may be easily realized using the read modified write mode of a DRAM. Line 4 is then fed to the output from line memory A, and line 5 of field 1 is immediately written into line memory A. Line 1 is fed to the output from line memory B, and line 6 of field 1 is immediately written into line memory B. Then line 5 is fed to the output from line memory A, and line 7 of field 1 is immediately written into line memory A. By repeating the sequence of operations just described, two fields of the signal VI2 are converted into one frame of the video signal VF. The state of the line memories during this process is shown in FIG. 10.

Figure 12:
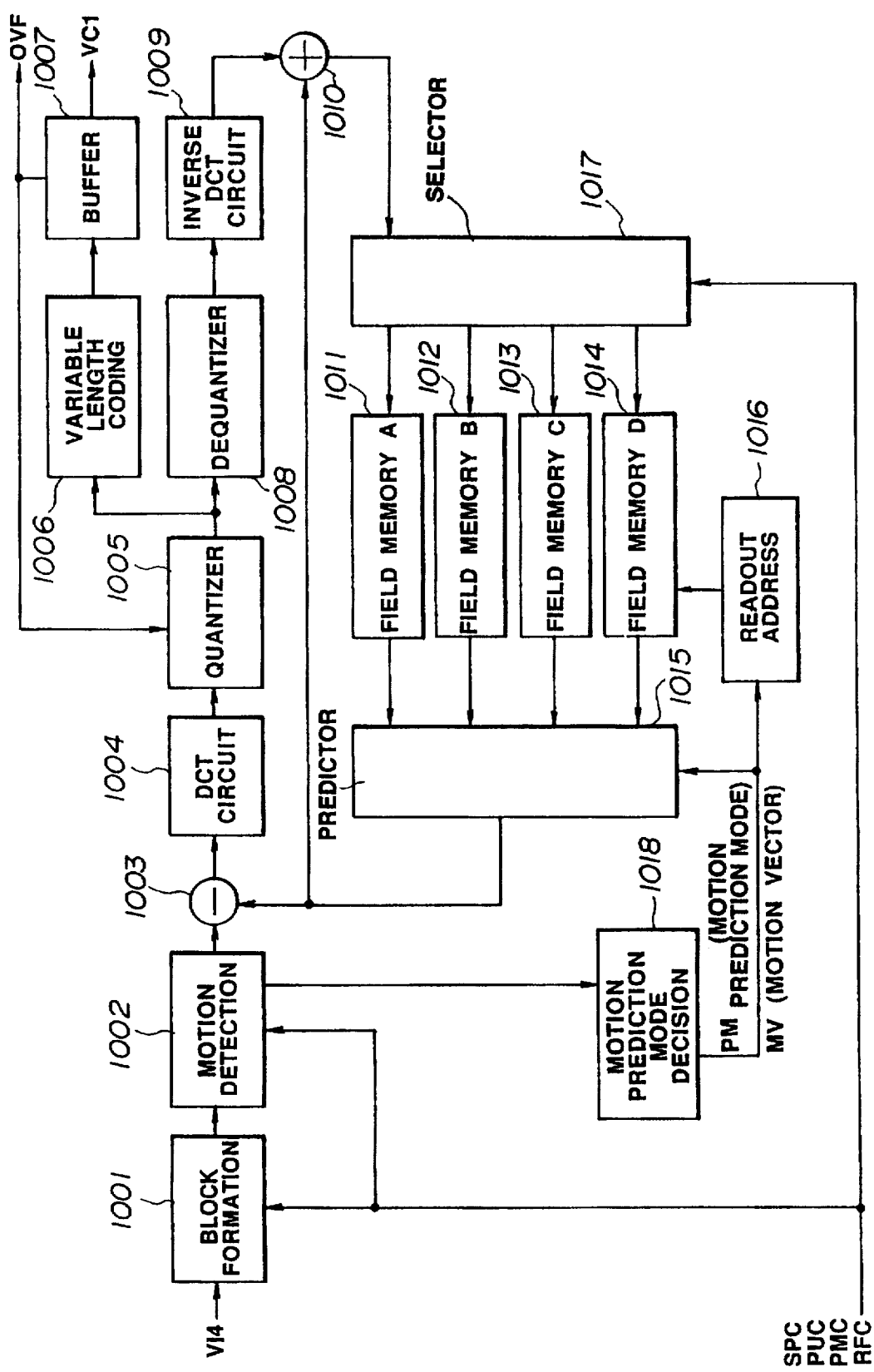
FIG. 12 is a block diagram showing the encoder of the coding apparatus according to the first embodiment of the present invention.
Figure 13:
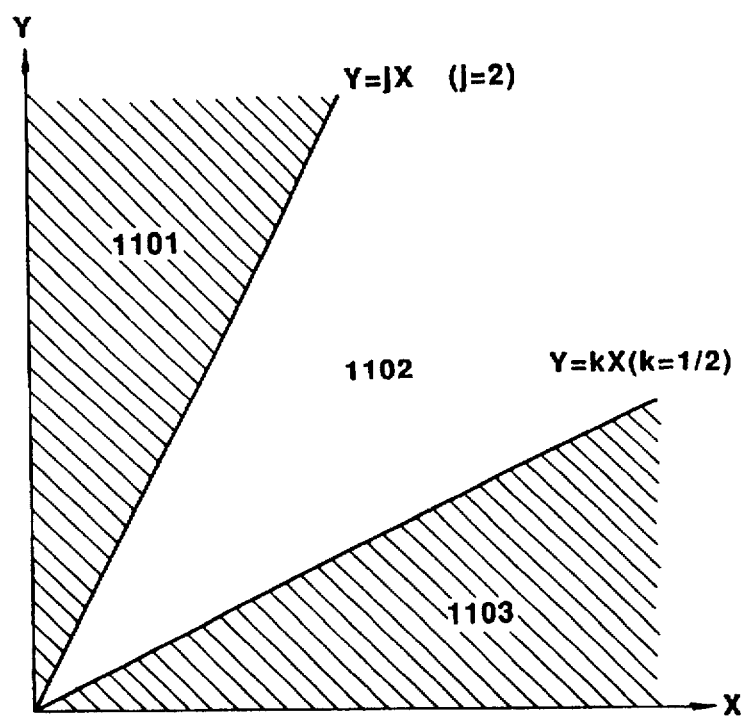
FIG. 13 illustrates motion prediction mode selection in the encoder.

The operation of the encoder 106 will be described with reference to FIGS. 8, 12, and 13. The arrangement of the encoder 106 is shown in the block diagram of FIG. 12, in which the encoder input signal VI4 is supplied to the block-forming circuit 1001. The block-forming circuit 1001 derives macroblocks from the encoder input signal VI4 and feeds them to the motion detection circuit 1002, whence they are fed to the subtractor 1003. Each macroblock is preferably a square matrix of 16×16 pixel values.

The subtractor 1003 is also supplied with motion-compensated macroblocks derived from one or more reference pictures by the field memories with motion compensation formed by the predictor 1015 and the field memories 1011 through 1014. The subtractor determines the motion prediction error between each pixel in the macroblock of the current picture and the corresponding pixel in the motion-compensated macroblock and feeds the resulting macroblock of motion prediction errors to the DCT circuit 1004.

The DCT circuit 1004 orthogonally transforms the motion prediction errors from the subtractor 1003 in blocks obtained by dividing each macroblock by four. The DCT circuit preferably applies a discrete cosine transform (DCT) to each block. The DCT coefficients produced by the DCT circuit 1004 are fed into to the quantizer 1005 where they are quantized using an adaptively-allocated number of bits. The quantized DCT coefficients from the quantizer 1005 are fed to the variable-length coding circuit 1006 where they are coded using variable-length coding such as Hufmann coding, or run-length coding. The resulting variable-length coded DCT coefficients are fed to the encoder buffer 1007, which provides the encoder output signal VC1, which normally has a constant bit rate.

The quantized DCT coefficients are also fed from the quantizer 1005 to the dequantizer 1008, where the quantizing applied by the quantizer 1005 is reversed, and thence to the inverse DCT circuit 1009, which performs an inverse orthogonal transform complementary to that performed by the DCT circuit 1004. Each resulting macroblock of reconstituted motion prediction errors is fed to the adder 1010, where it is added to the motion-compensated macroblock derived from one or more reference pictures by the predictor 1015. The resulting reconstituted macroblock of the current picture is fed to the selector 1017, whence it is fed to one of the field memories with motion compensation 1011 through 1014.

The overflow flag OVF for preventing an overflow or underflow of the encoder buffer 1007 is fed back from the encoder buffer 1007 to the quantizer 1005, and is also fed to the processing mode selection circuit 103 for use in determining skip pictures, as described above.

Each macroblock of the current picture is fed from the block-forming circuit 1001 to the motion detection circuit 1002. The motion detection circuit 1002 calculates the motion vector between each macroblock of the current picture and at least one possible reference macroblock. The motion detection circuit also generates the difference absolute value sum between the macroblock of the current picture and each possible reference macroblock. The motion detection circuit feeds the motion vector and the difference absolute value sum for each possible reference macroblock to the motion prediction mode decision circuit 1018.

Examples of how the motion prediction mode decision circuit 1018 determines the motion prediction mode PM will now be described.

The method by which one of the three motion prediction modes is selected for each macroblock of a B-picture will be described with reference to FIG. 13. The motion detection circuit 1002 calculates the difference absolute value sum X of the motion prediction errors of the macroblock relative to the corresponding macroblock in the later frame, and calculates the difference absolute value sum Y of the motion prediction errors of the macroblock relative to the corresponding macroblock in the earlier frame. Then, the motion prediction mode decision circuit 1018 selects the motion prediction mode as follows:

backward prediction from the later frame when $Y>jX$, i.e., when X and Y lie within the region 1101 shown in FIG. 13;

linear prediction from both the later and earlier frames when $kX \leq Y \leq jX$, i.e., when X and Y lie within the region 1102;

forward prediction from the earlier frame when $Y<kX$, i.e., when X and Y lie within the region 1103.

Preferably, $j=2$ and $k=0.5$.

The predictor 1015 of the field memory set with motion compensation receives the motion prediction mode PM and motion vector MV from the motion prediction mode decision circuit 1018. The field memories 1011 through 1014 receive readout addresses from the readout address generating circuit 1016, which generates readout addresses in response to the motion prediction mode PM and the motion vector MV. Thus, the field memories 1011 through 1014 with motion compensation and the predictor 1015 perform motion compensation in response to the motion prediction mode PM for motion prediction and the motion vector MV.

The decoding apparatus 101 of the present invention will now be described in more detail. The decoder 113 will first be described with reference to FIG. 14. The decoder input signal VD3, which normally has a constant bit rate, is temporarily stored in the buffer 1201. The signal for each picture in the decoder input signal is withdrawn from the buffer 1201, and is fed to the variable-length decoder 1202. The variable length decoder reverses the variable length coding applied by the variable length coder 1006 in the encoder, and extracts various control signals and flags. The dequantizer 1203 dequantizes each block of the picture signal in accordance with the extracted control signals and flags. The inverse DCT circuit 1204 applies an inverse orthogonal transform to each dequantized block, and four blocks of resulting motion prediction errors are combined to provide one macroblock. The dequantizer 1203 and the inverse DCT circuit 1204 are constructed to have characteristics that are complementary to those of the quantizer 1005 and the DCT circuit 1004, respectively, in the encoder.

Each macroblock of motion prediction errors is fed from the inverse DCT circuit 1204 to the adder 1205, where it is added to a corresponding reference macroblock from the predictor 1211. The resulting macroblock of the reconstituted current picture is fed to the selector 1206, and also to the field memories 1207 through 1210 of the field memory set with motion compensation. Outputs from the field memories 1207 through 1210 are fed via the predictor 1211 to the adder 1205. The predictor 1211 generates motion-compensated macroblocks from one or more reference pictures stored in the field memories 1207 through 1210 for combining in the adder 1205 with the macroblocks of motion predication errors generated by the inverse DCT circuit 1204.

Display addresses from the display address generator 1213 are also supplied to the field memories 1207 through 1210. The display address generator 1213 is supplied with frame sync pulse signals from the clock signal generator 1212 which generates clock signals in response to an external clock signal.

The variable-length decoder 1202 also extracts the reference picture code RFD and the skip picture flag SPD which, when it indicates a skip picture, causes the selector 1206 to provide the picture indicated by the reference picture code as a picture of the decoder output signal VO1.

Examples of how the decoder of the present embodiment copies reference pictures to provide skip pictures to replace the skip pictures that were eliminated in the coding process will be described by reference to FIGS. 15 and 16, which show skip pictures coded as P-pictures and B-pictures, respectively.

Figure 15:
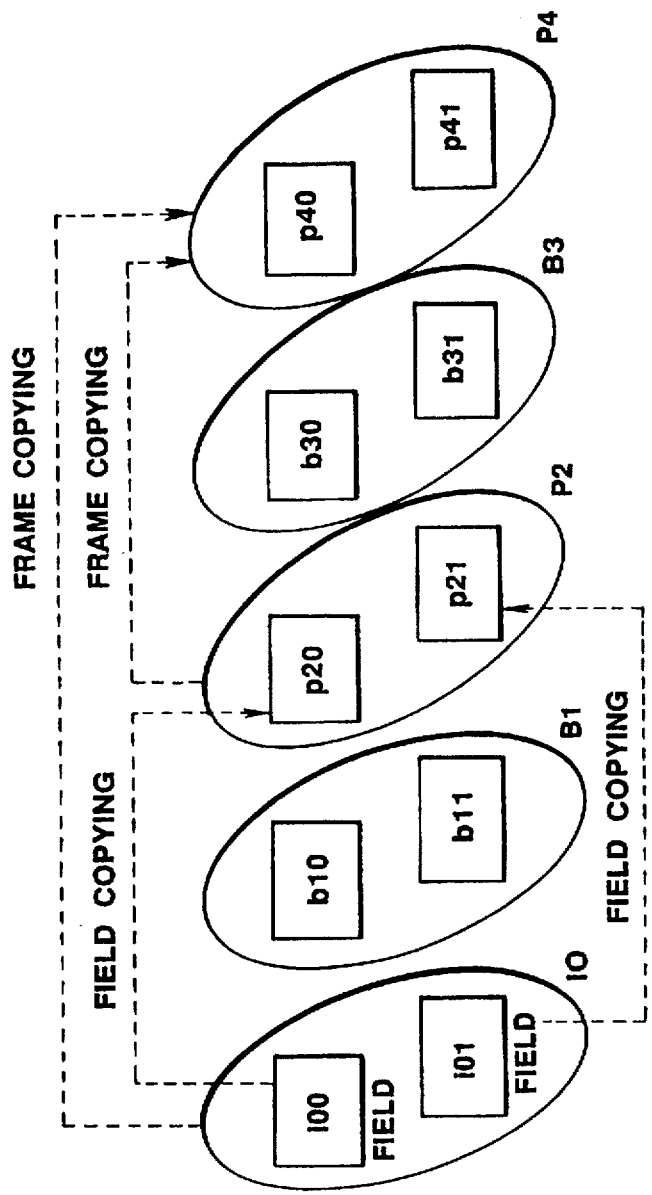
FIG. 15 illustrates duplication of a skip picture when the skip picture is a P-picture in the decoder of the decoding apparatus according to the present invention.

In FIG. 15, if the frame P2, a P-picture, is processed in field mode with the field p20 as the first field and the field p21 as the second field, and the field p20 is a skip picture, its reference picture being the field i00, the field p20 is reproduced by copying the field i00. On the other hand, if the field p21 is a skip picture, and its reference picture is the field i01, the field p21 is reproduced by copying the field i01.

As a further example, if the frame P4, a P-picture, is processed in frame mode, and the frame P4 is a skip picture, its reference frame being the frame P2, the frame P4 is reproduced by copying the frame P2. If the reference frame for the frame P4 is the frame I0, the frame P4 is reproduced by copying the frame I0.

Figure 16:
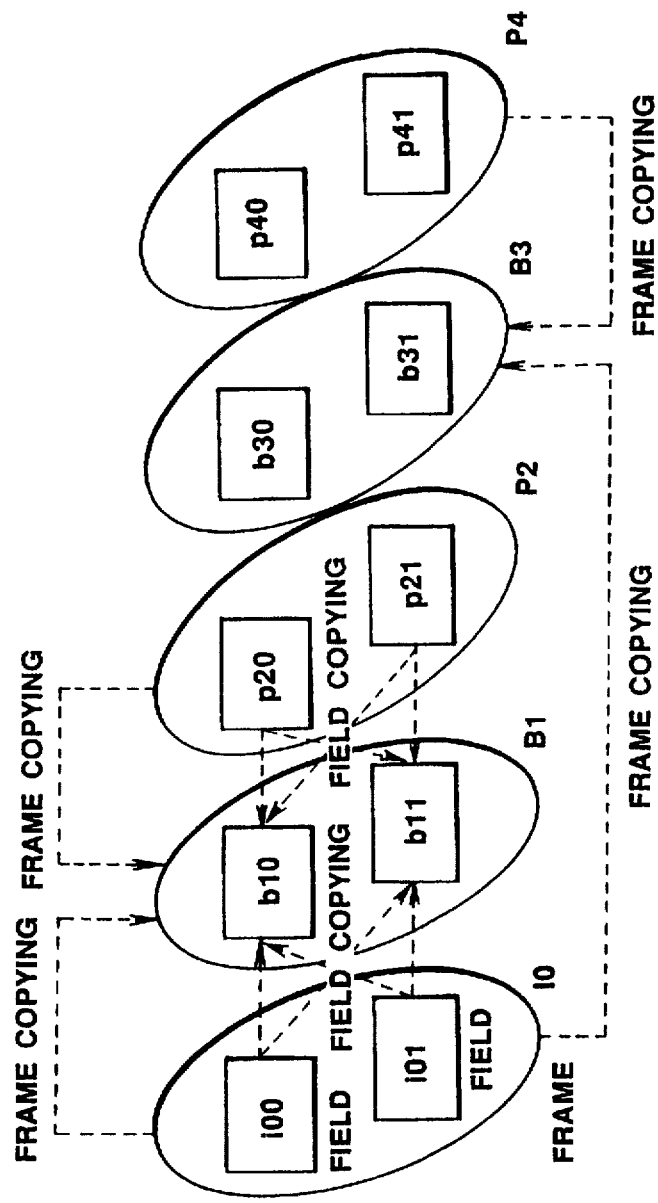
FIG. 16 illustrates duplication of a skip picture when the skip picture is a B-picture in the decoder of the decoding device according to the present invention.

Referring now to FIG. 16, which shows B-pictures, the frame Bi, a B-picture, is processed in field mode with the field b10 as the first field and with the field b11 as the second field. The field b10 is a skip picture, and the prediction mode is backward prediction from a later field with the field i00 as the reference picture. The field b10 is reproduced by coping the field i00.

Alternatively, if the prediction mode of the field b10 is forward prediction from an earlier field, with the reference picture being, e.g., the field p21, the field b10 is reproduced by copying the field p21.

As a further alternative, if the prediction mode of the field b10 bidirectional prediction from both later and earlier fields, with the reference pictures being, e.g., the field i00 and the field p21, the field b10 is reproduced by linear prediction from the field i00 and the field p21. In this, a reference macroblock from the later field and a reference macroblock from the earlier field are linearly processed pixel by pixel, such as by a mean value calculation, to provide a macroblock of the field b10.

As another example, B-pictures may be processed in frame mode. If the frame B3, a B-picture, is processed in frame mode, and the prediction mode is backward prediction from a later picture, with the reference picture being, e.g., the frame I0, the frame B3 is reproduced by copying the frame I0.

If the prediction mode is forward prediction from an earlier frame, with the reference picture being, e.g., the frame P4, the frame B3 may be reproduced by copying the frame P4.

If the prediction mode is bidirectional prediction from both later and earlier pictures, with the reference pictures being, e.g., the frames I0 and P4, the frame B3 is reproduced by linear prediction from frames I0 and P4. In this, a reference macroblock from the later frame and a reference macroblock from the earlier frame are linearly processed pixel by pixel, such as by a mean value calculation, to provide a macroblock of the frame B3.

The coding apparatus and the decoding apparatus according to a second embodiment of the present invention will now be described with reference to FIG. 17. The coding apparatus 840 according to the second embodiment will be described first. The coder input signal VI, a video signal with a field rate of 60 Hz, is fed into the 2-3 pull-down detection circuit 832, which detects duplicate fields and generates the duplication detection signal DDS in response to each duplicate field. The 2-3 pull-down detection circuit feeds out the coder input signal VI delayed by a delay time equal to the processing time of the 2-3 pull-down detection circuit as the video signal VI1.

The processing mode selection circuit 833 generates from the video signal VI1 and the duplication detection signal DDS the following four signals for each picture represented by the video signal VI1, in the same manner as described above:

the skip picture flag SPC, which indicates whether the picture is a duplicate picture, i.e., a picture that has little or no change relative to another picture;

the processing unit flag PUC, which indicates whether the picture is to be coded using frame mode coding or field mode coding;

the prediction mode code PMC, which indicates the prediction mode for the picture. The prediction mode code indicates whether the picture is to be coded as an I-picture (no prediction), a P-picture (forward predictive coding) or a B-picture (backward, bidirectional, or forward predictive coding); and the reference picture code RFC, which indicates, when the picture is a skip picture, the picture that is to be used as the reference picture for reproducing the skip picture.

The processing mode selection circuit also delays the video signal VI1 by the processing time of the processing mode selecting circuit 103 before feeding it out as the video signal VI2.

If the processing unit flag PUC generated by the processing mode selection circuit 833 indicates that the picture will be coded in frame mode, the field sequence changing and scan converting circuit 834 converts two fields of the field-based video signal VI2 into one frame. On the other hand, if the processing unit flag PUC indicates that the picture will be coded in field mode, the field sequence changing and scan converting circuit 834 does not perform a field-to-frame conversion.

Irrespective of whether it performs field-to-frame conversion, the field sequence exchange and scan converting circuit 834 changes the picture (field or frame) sequence of the video signal VI2 to the sequence required by the encoder 836. The picture sequence is changed in response to the skip picture flag SPC, the processing unit flag PUC, the prediction mode code PMC, and the reference picture code RFC to provide the encoder input signal VI4.

The encoder 836 encodes the video signal VI4 in response to the skip picture flag SPC, the processing unit flag PUC, the prediction mode code PMC and the reference picture code RFC generated by the processing mode selecting circuit 833. The encoder provides the resulting coded signal as the encoder output signal VC1. The encoder also includes the skip picture flag SPC, the processing unit flag PUC, the prediction mode code PMC and the reference picture code RFC from the processing mode selecting circuit 833, and the temporal-reference in the encoder output signal VC1.

The error correction coding (ECC) circuit 837 appends error correction codes to the encoded signal VC1 to provide the encoded signal VC2, which is modulated by the modulator 838 to provide the recording signal VC3 for recording on the recording medium 839.

The decoding apparatus 850 will now be described, also with reference to FIG. 17. The recorded signal VD1, read out from the recording medium 840, is demodulated by the demodulating circuit 841 to provide the demodulated signal VD2. The recording medium 840 is the same as, or is derived from, the recording medium 839. The ECC decoding circuit 842 detects and corrects errors in the demodulated signal VD2 to provide the decoder input signal VD3.

The decoder input signal VD3 is fed into the decoder 843, which extracts from the decoder input signal VD3 the skip picture flag SPC, the processing unit flag PUC, the prediction mode code PMC, the reference picture code RFC, and the temporal_reference for each picture. These flags and codes were originally generated by the processing mode selecting circuit 833 and the temporal reference generator 1020 in the coding apparatus 840. The decoder provides these flags and codes as the skip picture flag SPD, the processing unit flag PUD, the prediction mode code PMD, the reference picture code RFD, and the temporal_reference. The decoder 843 also decodes the picture signal in the decoder input signal VD3 to provide the decoding apparatus output signal VO.

The field sequence exchanging and scan converting circuit 844 of the decoding apparatus 850 of the second embodiment causes the decoder 843 to convert those pictures indicated by the processing unit flag PUD decoded by the decoder 843 as having been coded in frame mode into two fields of the decoding apparatus output signal VO. Otherwise, the circuit 844 causes the decoder to provide each two fields decoded from the decoder input signal VD3 as two fields of decoding apparatus output signal VO without conversion.

The field sequence exchange and scan converting circuit 844 also causes the decoder 843 to change the picture sequence of the decoder input signal VD3 so that the picture sequence of the decoding apparatus output signal VO is the same as that of the coder input signal VI. The field sequence exchange and scan converting circuit 844 causes the decoder 843 to change the picture sequence in response to the skip picture flag SPD, the processing unit flag PUD, the prediction mode code PMD, and the reference picture code RFD, and the temporal_reference decoded by decoder 843. The resulting decoding apparatus output signal VO is a video signal that is suitable for display on a monitor after conversion to an analog signal.

The coding apparatus 840 will now be described in more detail. The construction and operation of the 2-3 pull-down detection circuit 832 are similar to those described above with reference to FIGS. 4 and 5, and so will not be described again here.

Figure 18:
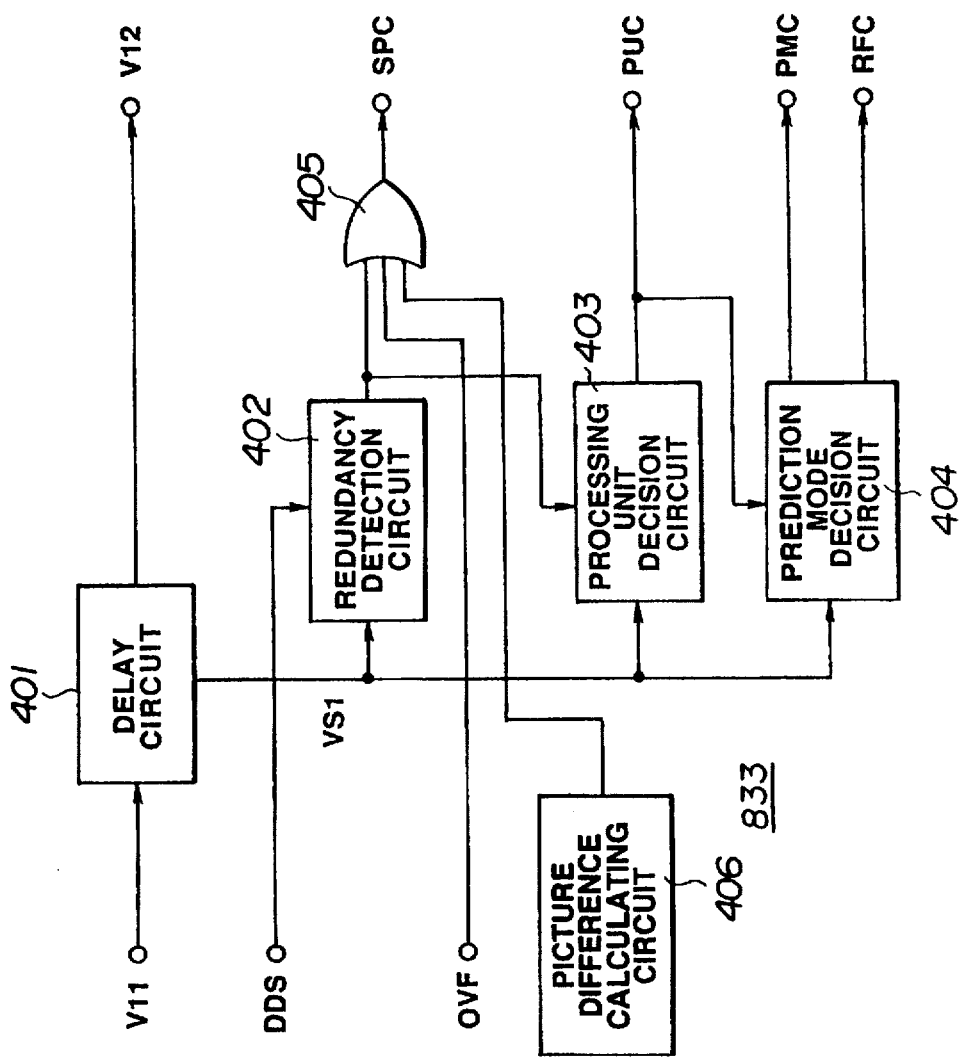
FIG. 18 is a block diagram showing the processing mode selecting circuit of the coding apparatus according to the second embodiment of the invention.

The construction of the processing mode selection circuit 833 according to the second embodiment of the invention is shown in FIG. 18. Operation of the circuit is similar to that described above with reference to FIGS. 7 and 8.

Referring to FIG. 18, the video signal VI1 is supplied to the delay circuit 401, which delays the video signal VI1 by different multiples of a field period and feeds multiple delayed signals out as the video signal VS1. The delay circuit 401 also delays the video signal VI1 by a delay equal to the processing time of the processing mode selection circuit 103, and feeds the delayed video signal to the scan converter and field sequence exchange circuit 834 as the video signal VI2.

The redundancy detection circuit 402 detects duplicate pictures (field or frame) in the video signal VI1. A duplicate picture is a picture that exhibits little or no change relative to another picture. The redundancy detection circuit 402 generates the skip picture flag SPC in response to each duplicate picture indicated by the duplication detection signal DDS.

The picture difference calculating circuit 406 calculates the pixel-bypixel difference between the current picture and plural other pictures in the video signal VS1. If the sum of the differences between the current picture and one of the other pictures is not greater than a certain threshold value, it is deemed that the picture exhibits little or no change relative to that other picture, and the picture difference calculating circuit 406 generates a skip picture flag SPC. In addition, the prediction mode decision circuit 404 generates a reference picture code RFC indicating the other picture as the reference picture for reproducing the skip picture. The threshold value may be increased when it is desired to increase the number of duplicate pictures skipped, and may be reduced when it is desired to increase the picture quality.

The processing mode selection circuit 833 also generates the skip picture flag SPC when it receives the overflow flag OVF from the encoder 836. Thus the processing mode selection circuit 833 includes the three-input OR gate 405, which ORs the outputs of the redundancy detection circuit 402, the picture difference calculating circuit 406, and the overflow flag OVF to provide the skip picture flag SPC.

As mentioned above, the processing mode selection circuit 833 also generates the skip picture flag SPC when the picture is intentionally designated as a skip picture, by, for example, the duplicate detection signal DDS. In the second embodiment, the encoder 836 includes the reference picture code RFC and the skip picture flag SPC together in the coding apparatus output signal VC1 in lieu of each skip picture, as will be described in detail below.

The prediction mode decision circuit 404 generates the prediction mode code PMC for each picture and the reference picture code RFC in response to each skip picture flag SPC. The prediction mode is the same as that described above with reference to FIG. 8.

The prediction mode code PMC has three possible states to denote the three possible motion prediction modes that can be used to code each picture:

No prediction. The picture is coded by itself without reference to another picture (I-picture);

Forward prediction made from an earlier reference picture i(P-picture); and

Bidirectional prediction from an earlier reference picture, a later reference picture, or by linear interpolation between an earlier reference picture and a later reference picture (B-picture).

The possible motion prediction modes for each macroblock of a B-picture are as follows: (i) backward prediction from a later picture; (ii) linear prediction from both later and earlier pictures, in which a reference macroblock from the later picture and a reference macroblock from the earlier picture are processed with linear processing from pixel to pixel, such as by mean value calculation, to provide a reference macroblock from which the macroblock of the current picture is predicted; and (iii) forward prediction from an earlier picture.

Figure 19:
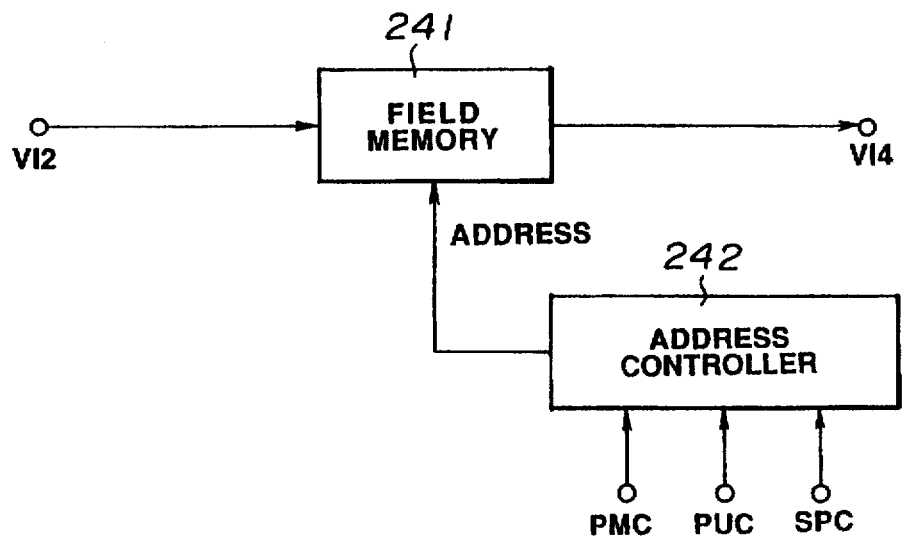
FIG. 19 is a block diagram showing the field order exchange and scan converting circuit of the coding apparatus according to the second embodiment of the invention.

The construction of the field sequence exchanging and scan converting circuit 834 is shown in FIG. 19. The operation of the field sequence exchanging and scan converting circuit 834 is similar to that described above with reference to FIGS. 9 through 11. The field sequence exchanging and scan converting circuit 834 is made up of the field memory set 241 for storing fields of the video signal VI2, and the address controller 242. In response to the processing unit flag PUC, the address controller 242 provides field-to-frame conversion by generating addresses for reading out alternate lines of the encoder input signal VI4 from the field memory set 241 in a manner similar to that described above with reference to FIG. 10 and 11.

In response to the processing mode flag PMC, the processing mode code PUC and the skip picture flag SPC, the address controller 242 generates addresses for reading pictures out of the field memory set 241 so that the pictures in the encoder input signal VI4 are arranged in the processing order required by the encoder 863.

The address controller 242 also generates the addresses for reading out from the field memory set 241 in response to the skip picture flag SPC, the processing unit flag PUC, and the prediction mode code PMC received from the processing mode selection circuit 803.

Figure 20:
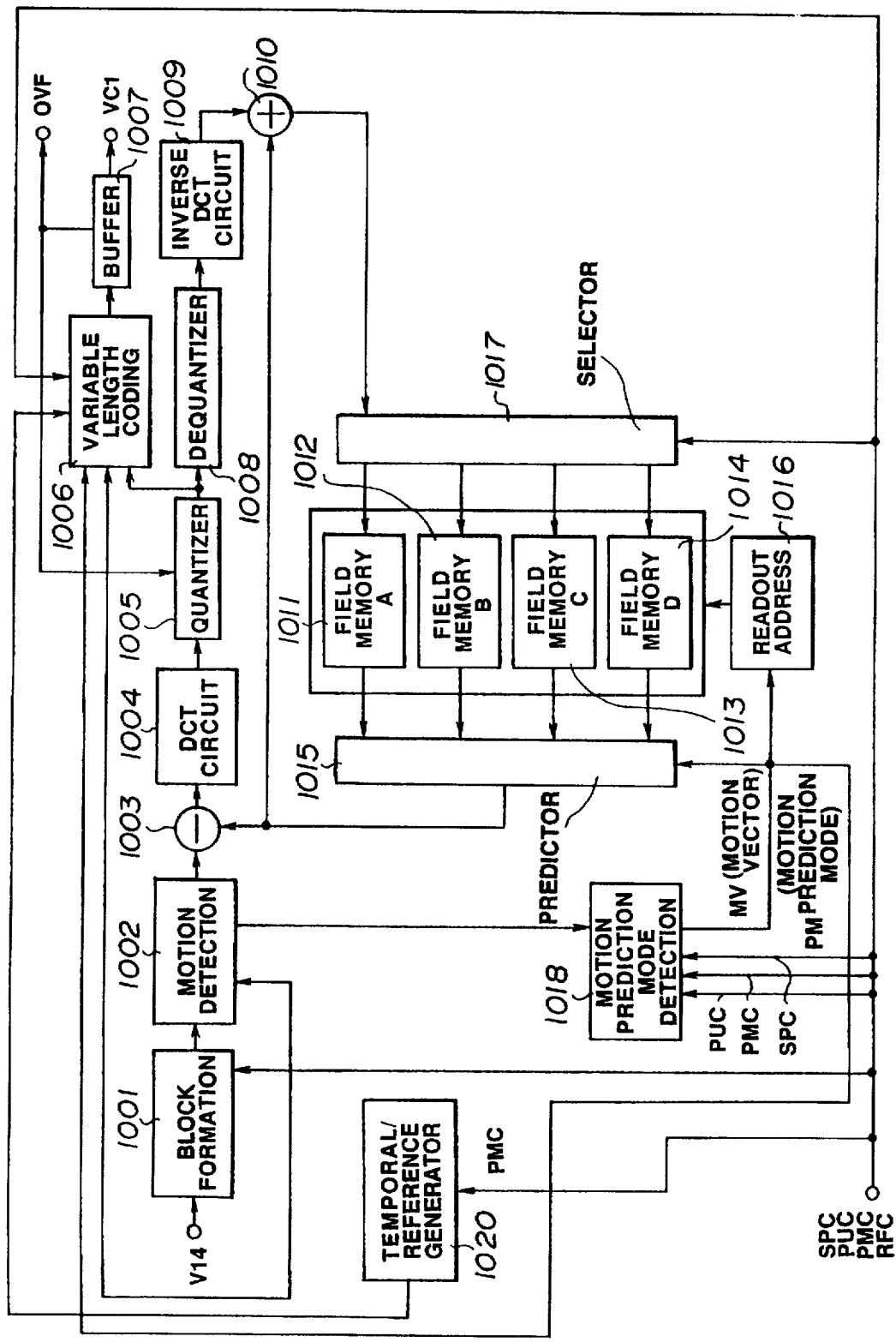
FIG. 20 is a block diagram showing the encoder in the coding apparatus according to the second embodiment of the invention.

The construction of the encoder 863, shown in FIG. 20, is substantially similar to that described above with reference to FIG. 12. However the encoder 863 additionally includes the temporal reference generating circuit 1020, which generates, in response to the prediction mode code PMC, a temporal_reference code for each picture. The temporal_ reference code is a 10-bit code that indicates the display sequence of the picture in a group of pictures (GOP). The temporal_reference code is generated by incrementing a counter by one for each consecutive picture in the coder input signal VI. The counter is reset to zero at the beginning of each GOP, or when the number of pictures in the GOP exceeds 1024. The temporal reference generator feeds the temporal_reference code to the variable-length coder 1006 for inclusion in the coding apparatus output signal VC1.

FIG. 20 also shows that the skip picture flag SPC, the processing unit flag PUC, the prediction mode code PMC, the reference picture code RFC, the motion prediction mode PM, and the motion vector MV are fed to the variable-length coder 1006 for inclusion in the coder output signal VC1, and that the skip picture flag SPC, the processing unit flag PUC, and the prediction mode code PMC are supplied to the motion prediction mode decision circuit 1018.

Figure 14:
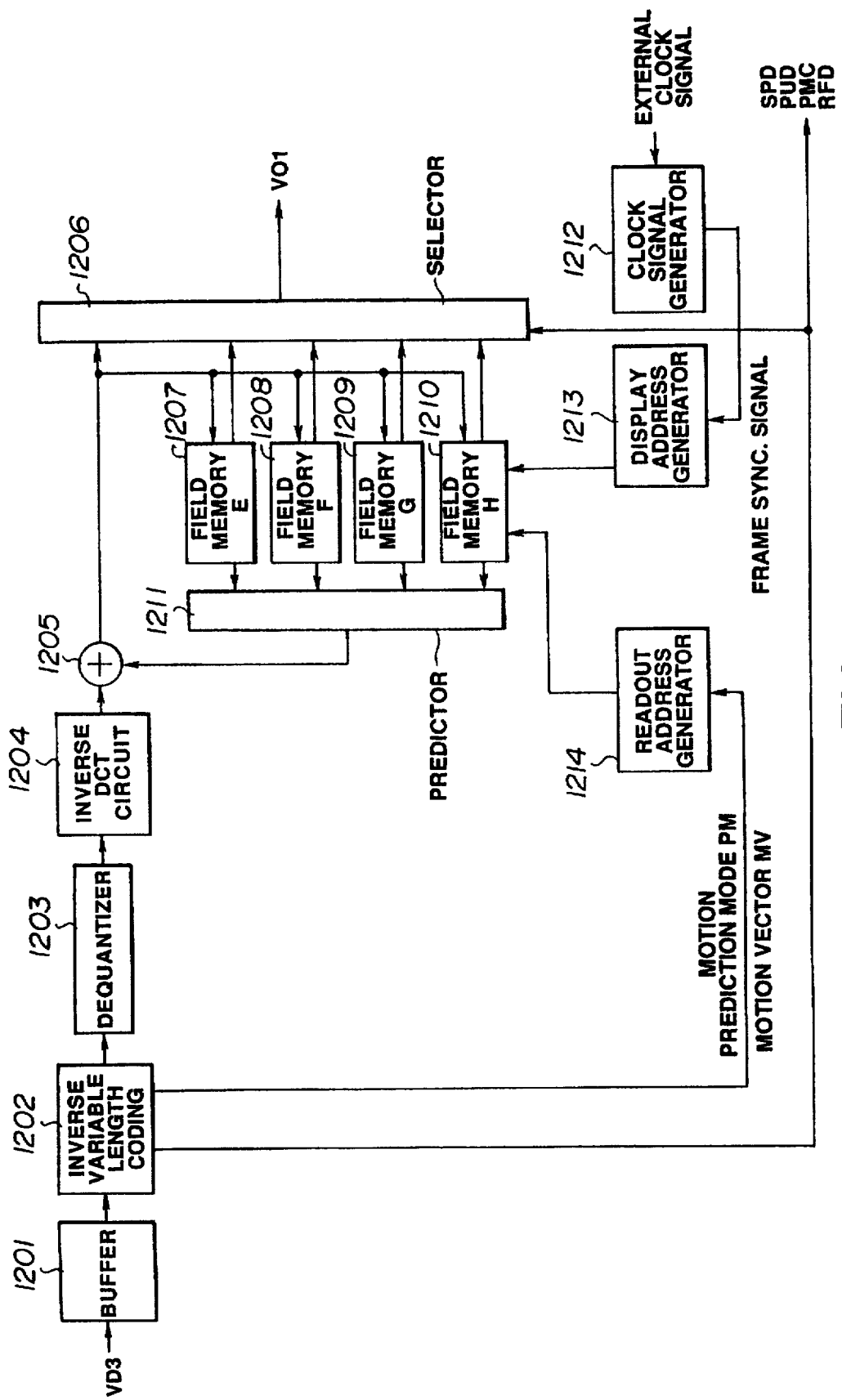
FIG. 14 is a block diagram showing decoder in the decoding apparatus according to the first embodiment of the invention.

The construction of the decoder 843 is similar to that shown in FIG. 14. However, the relation between the decoder 843 and the field sequence exchanging and scan converting circuit 844 in the second embodiment of the decoding apparatus 850, shown in FIGS. 17 and 21, is different from that shown in FIG. 3.

Figure 21:
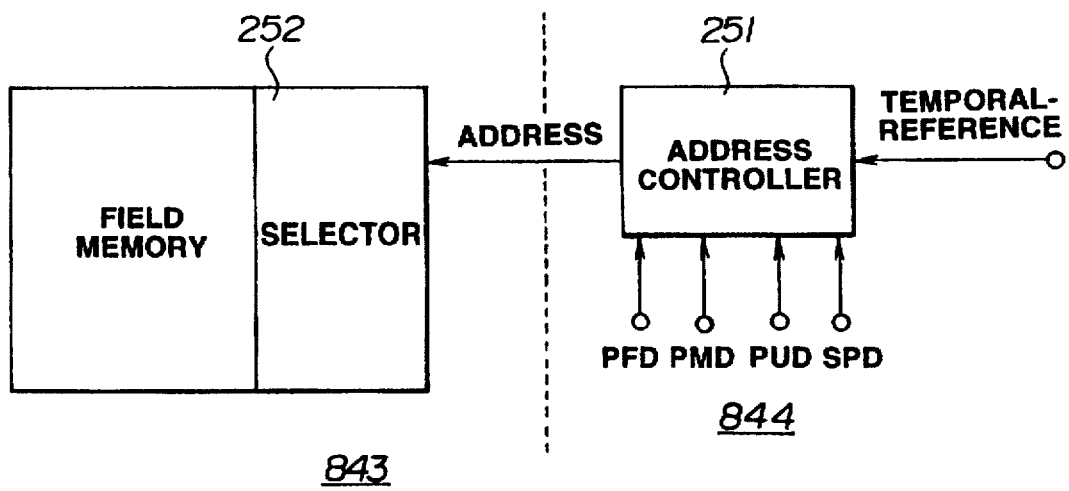
FIG. 21 is a block diagram illustrating the field order exchange and scan converting circuit of the decoding device according to the second embodiment of the invention.

Referring to FIG. 21, the field sequence exchanging and scan converting circuit 844 executes scan conversion and field sequence exchange in response to the skip picture flag SPD, the processing unit flag PUD, the prediction mode code PMD, the reference picture code RFD, and the temporal_reference extracted from the decoder input signal by the decoder 843. Specifically, the field sequence exchanging and scan converting circuit 844 consists of the address controller 251, which receives the skip picture flag SPD, the processing unit flag PUD, the prediction mode code PMD, the reference picture code RFD, and the temporal_reference code extracted from the decoder input signal. In response to the skip picture flag SPD, the processing unit flag PUD, the prediction mode code PMD, the reference picture code RFD, and the temporal_reference code, the field sequence exchanging and scan converting circuit 844 feeds readout addresses to the field memory set 252 with selector in the decoder 843 to cause the field memory set 252 to read out the field of the decoding apparatus output signal VO indicated by each readout address. The field memory set 252 is provided by the field memories 1207 through 1210 and the selector 1206 shown in FIG. 14.

Figure 17:
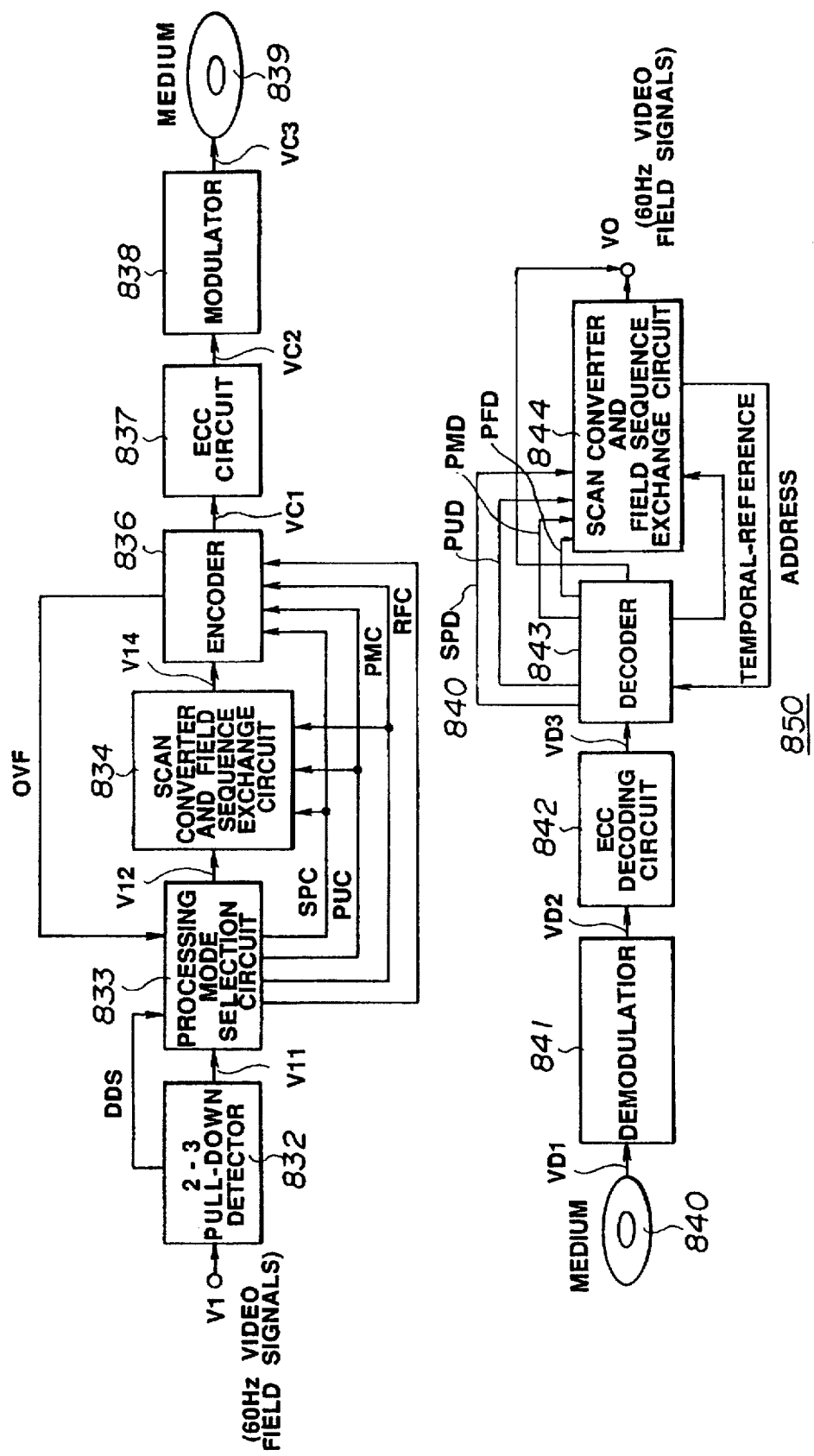
FIG. 17 is a block diagram showing the coding apparatus and the decoding apparatus according to the second embodiment of the present invention.

A third embodiment of the coding apparatus 840 which performs a parallel encoding process, will now be described with reference to FIG. 22, in which components corresponding to those shown in FIG. 17 are indicated by the same reference numerals.

Figure 22:
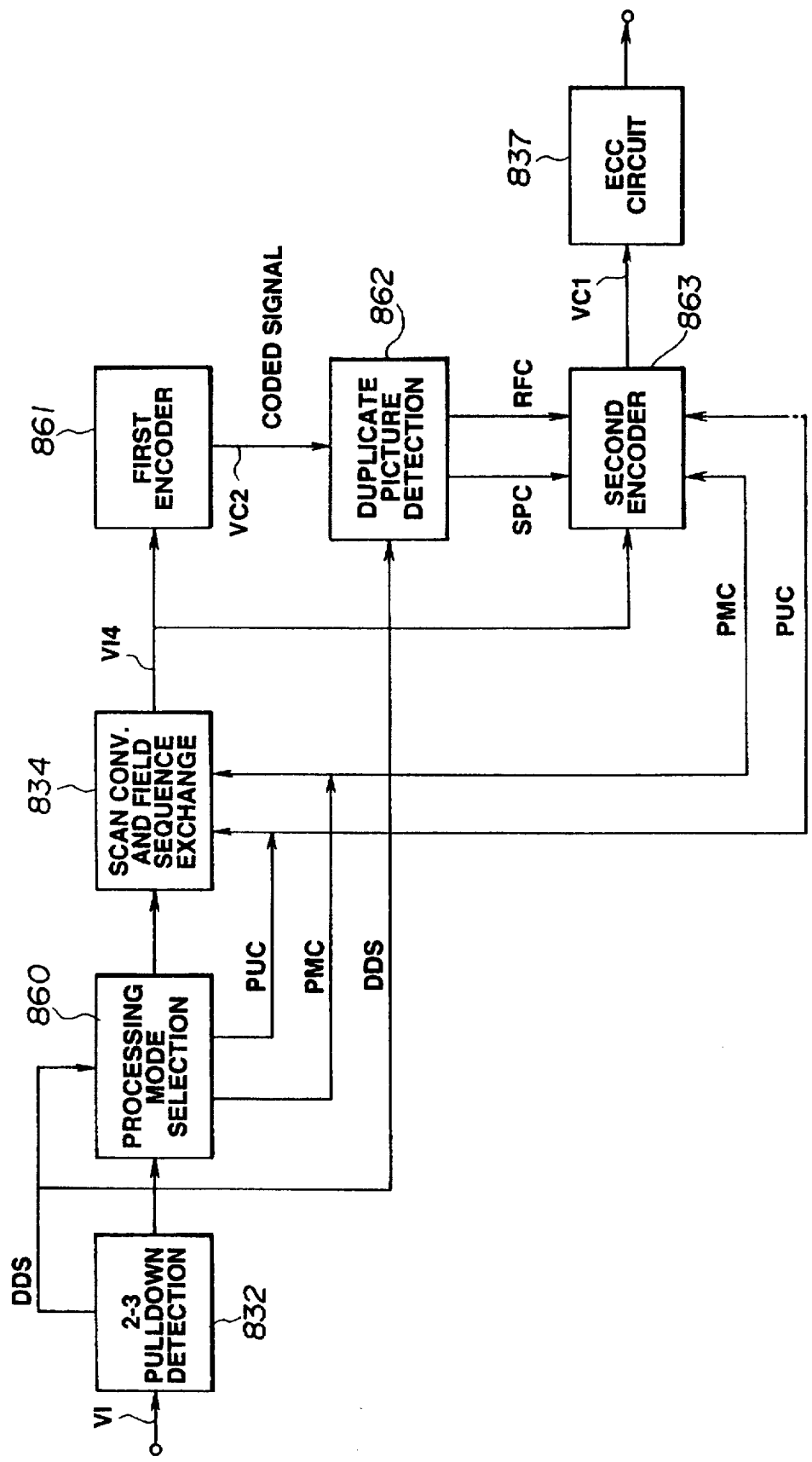
FIG. 22 is a block circuit diagram showing the arrangement of a third embodiment of the coding apparatus according to the invention in which coding is carried out in two passes.

The coding apparatus 840 shown in FIG. 22 employs the 2-3 pull-down detection circuit 832, the processing mode selection circuit 833, the scan converter and field sequence exchange circuit 860, the first encoder 861 and the second encoder 863, and the duplicate picture detection circuit 862. The 2-3 pull-down detection circuit 832, the scan converter and field sequence exchange circuit 834, and the second encoder 863 shown in FIG. 22 are similar to the 2-3 pull-down detection circuit 832, the scan converter and field sequence exchange circuit 834, and the encoder 836, respectively, shown in FIG. 17.

The processing mode selection circuit 860 is similar to the processing mode selection circuit 833 shown in FIGS. 17 and 18, but lacks the redundancy detection circuit 402, the picture difference calculating circuit 406, and the OR gate 405 shown in FIG. 18. Moreover, the prediction mode decision circuit 404 does not generate a reference picture code RFC. Thus, the processing mode selection circuit 860 simply generates the processing unit flag PUC, and the prediction mode code PMC.

The video signal VI2, the processing unit flag PUC, and the prediction mode code PMC are fed into the scan converter and field sequence exchange circuit 834, which, in response to the processing unit flag PUC, selectively interleaves the fields of the video signal VI2 to provide a progressive picture. The scan converter and field sequence exchange circuit 834 additionally rearranges the order of the pictures in the video signal VI2 to that required by the encoders 861 and 863 in response to the prediction mode code PMC, as described above. The scan converter and field sequence exchange circuit 834 provides the encoder input signal VI4.

The first encoder 861 codes the encoder input signal VI4 in a conventional manner. Since the first encoder 861 receives no skip picture flag SPC, or other duplicate picture information, the first encoder codes all pictures in the encoder input signal VI4, including duplicate pictures.

The resulting coded output signal VC2 is fed from the first encoder 861 to the duplicate picture detection circuit 862, which checks whether the coding of any of the pictures in the coded output signal VC2 meets the conditions that indicate that the picture is a duplicate picture, and need not be coded. A coded picture is determined to be a duplicate picture if it meets the following conditions:

If the picture is coded as a P-picture:
  (i) All macroblocks in the picture are predicted from the same earlier picture (frame or field), and the magnitude of the motion vector is zero; and
  (ii) There are no DCT coefficients.

If the picture is coded as a B-picture:
  (i) For all macroblocks in the picture:
    (a) the prediction mode (prediction from both earlier and later pictures, prediction from a later picture, or prediction from an earlier picture) is the same, (b) the reference picture(s) is/are the same, and (c) the magnitude of the motion vector is zero; and (ii) There are no DCT coefficients.

The duplicate picture detection circuit 862 generates a skip picture flag SPC and a reference picture code RFC for each picture (frame or field) that it finds which satisfies the above-mentioned conditions. The reference picture code RFC indicates the picture that is to be used as the reference picture to duplicate the skip picture.

The duplicate picture detection circuit 862 additionally receives the duplicate detection signal DDS from the 2-3 pull-down detection circuit 832, and additionally generates a skip picture flag SPC and a reference picture code RFC for each picture that the duplicate detection signal DDS indicates is a duplicate picture. The duplicate picture detection circuit 862 feeds each skip picture flag SPC and each reference picture code RFC to the second encoder 863.

The second encoder 863, which is identical to the encoder 836 shown in FIG. 17, also receives the input signal VI4; the processing unit flag PUC and the prediction mode code PMC from the processing mode decision circuit 860; and the skip picture flag SPC and the reference picture code RFC from the duplicate picture detection circuit 862. In response to these control signals and flags, the second encoder 863 encodes the encoder input signal VI4 in the same way as the encoder 836 described above with reference to FIG. 17. When the skip picture flag SPC indicates that a picture is a duplicate picture, the second encoder 863 inserts the skip picture flag and the reference picture code RFC into the coding apparatus output signal VC1 in lieu of the duplicate picture.

The decoder for a signal coded by the coding apparatus shown in FIG. 22 is identical to the decoder 101 shown in FIG. 17, and so will not be described again here.

Finally, the recording medium 109 or 110 shown in FIG. 3, or the recording medium 839 or 840 shown in FIG. 17, is a recording medium on which are recorded signals coded by the above-mentioned coding apparatus of the present invention. The skip picture flag SPC, the processing unit flag PUC, the prediction mode code PMC, the reference picture code RFC, motion vector MV, the motion prediction mode PM, and the temporal_reference are included together with the signal for each picture in the recording signal recorded on the recording medium to indicate the coding parameters of each picture.

The recording medium may be a disc-shaped recording medium, such as an optical disc, recordable optical disc, or a hard disc, a tape-based recording medium, a semiconductor memory, or an IC card. Alternatively, the coding apparatus output signal VC1 may be broadcast using a suitable broadcast system, cable distribution system, telephone system, etc.

With the above-described coding method and apparatus for video signals according to the present invention, since the unit in which each picture is coded may be adaptively switched between fields and frames, in response to the properties of input picture signal, the coding efficiency may be increased compared with processing the picture signal solely in units of fields or units of frames.

In addition, coding a frame derived from two consecutive frames of a motion picture film source on a field-by-field basis further improves the compression efficiency. A frame derived from two consecutive frames of a motion picture film source is coded such that it is not used as a reference frame for predicting other pictures. The prevents the reduced quality of this frame from lowering the picture quality of other frames.

Finally, the compression efficiency is further increased by not coding each duplicate picture, and by including a skip picture flag in the coding apparatus output signal instead.

Recording a video signal coded as just described on the recording medium of the present invention uses the recording capacity of the recording medium more effectively.

A decoding apparatus designed for executing the decoding method according to the present invention will produce decoded pictures with a high picture quality.

We claim:

1. A method for coding an input video signal to provide a coded signal, the method comprising the steps of:

detecting duplicate pictures in the input video signal;

in response to the detecting step, eliminating each detected duplicate picture from the video signal to provide an encoder input signal;

predictive coding the encoder input signal using plural predictive coding methods to provide the coded signal;

including in the coded signal:

a skip-picture flag in lieu of each eliminated duplicate picture; and a reference picture code identifying a field to be copied to provide each eliminated duplicate picture, wherein, in the step of detecting duplicate pictures, a picture to be coded using forward prediction is detected as a duplicate picture when all macroblocks in the picture are predicted from one reference picture, and have a motion vector with a zero magnitude, and no DCT coefficients are generated, and a picture to be coded using bidirectional prediction is detected as a duplicate picture when all macroblocks of the picture have the same prediction mode, are predicted from one reference picture, and have a motion vector with a zero magnitude, and no DCT coefficients are generated.

2. An apparatus for coding an input video signal to provide a coded signal, the apparatus comprising:

detecting means for detecting duplicate pictures in the input video signal;

means for eliminating, in response to the detecting means, each detected duplicate picture from the input video signal to provide an encoder input signal;

predictive coding means for predictively coding the encoder input signal using plural predictive coding methods to provide the coded signal; and means for including in the coded signal:

a skip-picture flag in lieu of each eliminated duplicate picture, and a reference picture code identifying a field to be copied to provide each eliminated duplicate picture, wherein the detecting means is for detecting a picture to be coded using forward prediction as a duplicate picture when all macroblocks in the picture are predicted from one reference picture, and have a motion vector with a zero magnitude, and no DCT coefficients are generated, and is for detecting a picture to be coded using bidirectional prediction as a duplicate picture when all macroblocks of the picture have the same prediction mode, are predicted from the one reference picture, and have a motion vector with a zero magnitude; and no DCT coefficients are generated.

* * * * *